(12) United States Patent
Barnard et al.

(10) Patent No.: US 12,740,666 B2
(45) **Date of Patent: *Sep. 22, 2026**

(54) FLUID TEXTURING DEVICE

(71) Applicant: SharkNinja Operating LLC, Needham, MA (US)

(72) Inventors: Pierce Barnard, Manly (AU); Tao Yi, Guangdong (CN)

(73) Assignee: SharkNinja Operating LLC, Needham, MA (US)

( * ) Notice: Subject to any disclaimer, the term of this patent is extended or adjusted under 35 U.S.C. 154(b) by 975 days.

This patent is subject to a terminal disclaimer.

(21) Appl. No.: 17/964,140

(22) Filed: Oct. 12, 2022

(65) Prior Publication Data

US 2024/0065472 A1 Feb. 29, 2024

Related U.S. Application Data

(63) Continuation of application No. PCT/CN2022/115246, filed on Aug. 26, 2022.

(51) Int. Cl.

*A47J 31/44* (2006.01)
*A47J 43/044* (2006.01)
*A47J 43/07* (2006.01)

(52) U.S. Cl.

CPC ......... *A47J 31/4489* (2013.01); *A47J 43/044* (2013.01); *A47J 43/0711* (2013.01); *A47J 2043/0449* (2013.01)

(58) Field of Classification Search

CPC .......... A47J 31/005; A47J 31/02; A47J 31/20; A47J 31/24; A47J 31/30; A47J 31/1132;

(Continued)

(56) References Cited

U.S. PATENT DOCUMENTS 7,172,177 B2 2/2007 Durda
7,264,232 B2 9/2007 Rohde (Continued)

FOREIGN PATENT DOCUMENTS

AU 2020312635 A1 1/2022
CN 101106928 A 1/2008

(Continued)

OTHER PUBLICATIONS

International Search Report and Written Opinion Received on Mar. 15, 2023 in PCT Application No. PCT/CN2022/115246, filed on Aug. 26, 2022, 10 pages.

(Continued)

*Primary Examiner* — Phuong T Nguyen
(74) *Attorney, Agent, or Firm* — Mintz, Levin, Cohn, Ferris, Glovsky and Popeo, P.C.

(57) ABSTRACT

A fluid texturing device is provided for use with a beverage brewing apparatus. In one embodiment, the fluid texturing device can include a housing a housing extending between a first end and a second end. The fluid texturing device can also include a hollow driveshaft arranged within the housing and having an air path extending from the first end to the second end of the housing. The hollow driveshaft can include a coupling arranged therein and axially movable within the hollow driveshaft such that the coupling can variably block the air path to prevent a flow of air through the air path. The fluid texturing device can also include a whisk assembly removably coupled to the second end of the housing and including a whisk mated to the driveshaft such that the driveshaft can rotate the whisk.

20 Claims, 28 Drawing Sheets

(58) Field of Classification Search
CPC .......... A47J 31/38; A47J 31/44; A47J 31/446; A47J 31/467; A47J 31/468; A47J 31/605; A47J 31/4407; A47J 31/5253; A47J 31/521; A47J 31/3633; A23F 3/166
USPC ......... 99/280, 281, 282, 283, 284, 286, 287, 99/292, 295, 297, 303, 306, 308, 322
See application file for complete search history.

(56) References Cited

U.S. PATENT DOCUMENTS 8,348,186 B2 1/2013 Seidler et al.
8,616,118 B1 12/2013 Lassota
8,668,376 B2 3/2014 Krauchi et al.
8,726,790 B2 5/2014 Lane et al.
8,733,234 B2 5/2014 Boussemart et al.
8,875,618 B2 11/2014 Boussemart et al.
8,960,080 B2 2/2015 Saito
9,003,957 B2 4/2015 Pagano
9,060,646 B2 6/2015 Ait Bouziad et al.
9,107,533 B2 8/2015 Volz et al.
9,113,751 B2 8/2015 Cocco et al.
9,295,109 B2 3/2016 Gerl et al.
9,402,502 B2 8/2016 Vanni et al.
9,468,331 B2 10/2016 De'Longhi
9,603,481 B2 3/2017 Giua et al.
9,609,978 B2 4/2017 Castelli et al.
10,178,925 B2 1/2019 Rithener et al.
10,178,926 B2 1/2019 Beaudet et al.
10,362,895 B2 7/2019 Beaudet et al.
10,455,973 B2 10/2019 Dollner et al.
10,524,617 B2 1/2020 Perrin et al.
10,631,686 B2 4/2020 Abdo et al.
10,786,118 B2 9/2020 Zeng et al.
11,160,411 B2 11/2021 Kettavong et al.
11,246,446 B2 2/2022 Anthony et al.
2005/0029685 A1* 2/2005 Zhao .................... A47J 43/044 261/87
2009/0116333 A1 5/2009 Lu et al.
2009/0255415 A1 10/2009 Cheng et al.
2012/0186462 A1 7/2012 Breust
2013/0032038 A1 2/2013 Lee et al.
2013/0269535 A1 10/2013 Ryser et al.
2015/0013551 A1 1/2015 Tsang et al.
2015/0013552 A1 1/2015 Tsang et al.
2016/0192807 A1 7/2016 Ait Bouziad et al.
2017/0318999 A1 11/2017 Han et al.
2019/0365142 A1* 12/2019 Beaudet ................. A47J 31/46
2020/0138234 A1 5/2020 Grassia et al.
2021/0007319 A1 1/2021 Hellmers et al.
2021/0393074 A1 12/2021 Weber et al.

FOREIGN PATENT DOCUMENTS

CN 201200323 Y 3/2009
CN 201948820 U 8/2011
CN 202044136 U 11/2011
CN 202234930 U 5/2012
CN 202269902 U 6/2012
CN 102781292 A 11/2012
CN 101947428 B 1/2013
CN 202636716 U 1/2013
CN 202698925 U 1/2013
CN 202698926 U 1/2013
CN 102233245 B 3/2013
CN 202801244 U 3/2013
CN 202908518 U 5/2013
CN 103169379 A 6/2013
CN 103203201 A 7/2013
CN 103237483 A 8/2013
CN 203302917 U 11/2013
CN 203314747 U 12/2013
CN 103505080 A 1/2014
CN 203483288 U 3/2014
CN 203506429 U 4/2014
CN 203619395 U 6/2014
CN 203693311 U 7/2014
CN 203828698 U 9/2014
CN 203852248 U 10/2014
CN 203953322 U 11/2014
CN 104207641 A 12/2014
CN 203970116 U 12/2014
CN 203987593 U 12/2014
CN 204016064 U 12/2014
CN 104706218 A 6/2015
CN 204500413 U 7/2015
CN 204683343 U 10/2015
CN 204743776 U 11/2015
CN 105193259 A 12/2015
CN 105595851 A 5/2016
CN 205286056 U 6/2016
CN 205286123 U 6/2016
CN 205286124 U 6/2016
CN 103284601 B 8/2016
CN 206120110 U 4/2017
CN 106720022 A 5/2017
CN 206166634 U 5/2017
CN 206166635 U 5/2017
CN 107361630 A 11/2017
CN 107510366 A 12/2017
CN 107510367 A 12/2017
CN 207041419 U 2/2018
CN 207041420 U 2/2018
CN 107752804 B 3/2018
CN 105451618 B 4/2018
CN 104207641 B 5/2018
CN 108175277 A 6/2018
CN 104939683 B 8/2018
CN 105768880 B 10/2018
CN 108852055 A 11/2018
CN 208144910 U 11/2018
CN 208404176 U 1/2019
CN 109381026 A 2/2019
CN 208551295 U 3/2019
CN 208658655 U 3/2019
CN 104869876 B 4/2019
CN 208692999 U 4/2019
CN 208725556 U 4/2019
CN 208725557 U 4/2019
CN 105942860 B 5/2019
CN 109864585 A 6/2019
CN 208925925 U 6/2019
CN 209074206 U 7/2019
CN 209574472 U 11/2019
CN 209789654 U 12/2019
CN 110652207 A 1/2020
CN 209984034 U 1/2020
CN 209984036 U 1/2020
CN 110934498 A 3/2020
CN 210276947 U 4/2020
CN 210748868 U 6/2020
CN 211186946 U 8/2020
CN 212140184 U 12/2020
CN 112244669 A 1/2021
CN 212415491 U 1/2021
CN 112568748 A 3/2021
CN 213309229 U 6/2021
CN 214341790 U 10/2021
CN 214653940 U 11/2021
CN 114126456 A 3/2022
DE 3829326 A1 3/1990
DE 102007035939 A1 2/2009
EP 1197175 A1 4/2002
EP 1827188 B1 1/2009
EP 1833338 B1 2/2009
EP 2198762 B1 8/2011
EP 2299879 B1 5/2012
EP 2348932 B1 11/2012
EP 2341806 B1 1/2013
EP 2568859 A1 3/2013
EP 2721980 A1 4/2014
EP 2547243 B1 5/2014
EP 2606783 B1 5/2014
EP 2737832 A1 6/2014

(56) References Cited

FOREIGN PATENT DOCUMENTS

| | | | |
|---|---|---|---|
| EP | 2910160 | A1 | 8/2015 |
| EP | 2898802 | B1 | 9/2018 |
| EP | 2882320 | B1 | 10/2018 |
| EP | 2875759 | B1 | 6/2019 |
| EP | 2946707 | B1 | 6/2019 |
| EP | 3473145 | A4 | 6/2019 |
| EP | 3574809 | A1 | 12/2019 |
| EP | 3586702 | A1 | 1/2020 |
| EP | 3424377 | B1 | 3/2020 |
| EP | 3626138 | A1 | 3/2020 |
| EP | 3517000 | B1 | 6/2020 |
| EP | 3516999 | B1 | 7/2020 |
| EP | 3586703 | B1 | 11/2020 |
| EP | 3626137 | B1 | 6/2021 |
| EP | 3626136 | B1 | 7/2021 |
| EP | 3586702 | B1 | 1/2022 |
| EP | 3965624 | A1 | 3/2022 |
| FR | 3083070 | B1 | 6/2020 |
| WO | 2011142661 | A1 | 11/2011 |
| WO | 2012093157 | A1 | 7/2012 |
| WO | 2013033996 | A1 | 3/2013 |
| WO | 2013107131 | A1 | 7/2013 |
| WO | 2018201178 | A1 | 11/2018 |
| WO | 2019000016 | A1 | 1/2019 |
| WO | 2020113288 | A1 | 6/2020 |
| WO | 2020182244 | A2 | 9/2020 |
| WO | 2020182244 | A3 | 11/2020 |
| WO | 2021009032 | A1 | 1/2021 |
| WO | 2021160893 | A1 | 8/2021 |

OTHER PUBLICATIONS

Extended European Search Report received for European Patent Application No. 22956142.8, mailed on Apr. 28, 2026, 11 pages.

* cited by examiner

FLUID TEXTURING DEVICE

CROSS-REFERENCES TO RELATED APPLICATIONS

This application is a continuation of PCT International Patent Application No. PCT/CN22/115246 filed on Aug. 26, 2022, the entire contents of which is incorporated herein by reference in its entirety.

FIELD

Beverage brewing apparatuses and fluid texturing devices for use therewith is provided.

BACKGROUND

Various systems and methods for brewing a beverage, such as coffee or tea, are known. These systems typically include drip brewing systems in which hot water is brewed through coffee grounds and into a carafe, or French press systems in which coffee grounds and water are mixed in a container and a water permeable plunger is pressed into the container from above to trap the ground coffee at the bottom of the container. Existing beverage brewing systems are typically designed to receive only a single format of flavorant, such as loose coffee grinds, or alternatively, a prepackaged capsule or cartridge of coffee grinds.

Many coffee and espresso based drinks include a form of heated and textured milk or milk-like substitute. A device that includes a means of steam injection as a heat source in conjunction with a spinning whisk to aid in the distribution of steam and air throughout milk or a milk-like substitute is known as a fluid texturing device. In order to achieve the proper consistency using a steam source, a user must be trained to add the proper amount of steam and whisking to the milk. At-home or stand-alone devices for texturing fluid propose to provide a simpler operation with similar texturing results. However, many of these devices are insufficient at producing a properly textured product. Existing integrated or stand-alone fluid texturing devices result in a single milk froth type across all settings due to their limited capacity.

SUMMARY

Beverage brewing apparatuses and fluid texturing devices for use therewith are provided.

In one aspect, a fluid texturing device is provided. In one embodiment, the fluid texturing device can include a housing a housing extending between a first end and a second end. The fluid texturing device can also include a hollow driveshaft arranged within the housing and having an air path extending from the first end to the second end of the housing. The hollow driveshaft can include a coupling arranged therein and axially movable within the hollow driveshaft such that the coupling can variably block the air path to prevent a flow of air through the air path. The fluid texturing device can also include a whisk assembly removably coupled to the second end of the housing and including a whisk mated to the driveshaft such that the driveshaft can rotate the whisk.

The fluid texturing device can have a variety of configurations. For example, in some embodiments, the driveshaft can include a slot extending circumferentially therearound, and the coupling can include at least one post movably arranged within the circumferential slot such that rotation of the driveshaft in a first rotational direction can move the coupling in a first axial direction relative to the driveshaft, and rotation of the driveshaft in a second rotational direction can move the coupling in a second axial direction relative to the driveshaft. In another embodiment, the coupling can be configured to unseal the air path when moving in the first axial direction, and is configured to seal the air path when moving in the second axial direction. In another embodiment, the coupling can include a seal configured to contact an inner portion of the driveshaft to block the air path.

In another embodiment, the whisk can include a second air path fluidly coupled to the air path of the driveshaft. In another embodiment, the whisk can include at least one mixing arm arranged perpendicular to the second air path. The mixing arm can include a third air path fluidly coupled to the second air path and an air outlet arranged at a distal end of the mixing arm. In another embodiment, a steam injection tube can be arranged within the housing and can extend through the whisk assembly to position a steam outlet on the steam ejection tube adjacent to the whisk.

In another aspect, a fluid texturing device is provided. In one embodiment, the fluid texturing device can include a housing having an inner lumen extending therethrough between a first end and a second end. The fluid texturing device can also include a driveshaft disposed within the inner lumen of the housing. The driveshaft can include a first end coupled to the first end of the housing and can be configured to couple to a motorized driver for causing rotation of the driveshaft about a longitudinal axis thereof. The driveshaft can also include a second end adjacent to the second end of the housing and can have a whisk mounted thereon and configured to rotate with the driveshaft. The driveshaft can also include an air path extending from the first end to the second end. The fluid texturing device can also include a coupling arranged within the driveshaft at the first end and axially movable relative to the driveshaft such that the coupling can variably block the air path to prevent a flow of air through the air path.

The fluid texturing device can have a variety of configurations. For example, in some embodiments, the coupling can include at least one post movably arranged within a slot in the driveshaft such that rotation of the driveshaft in a first rotational direction can move the coupling in a first axial direction relative to the driveshaft, and rotation of the driveshaft in a second rotational direction can moves the coupling in a second axial direction relative to the driveshaft. In some embodiments, the first end of the housing can have at least one connecting feature configured to removably couple the housing to a beverage brewing apparatus. In another embodiment, the whisk can be removably coupled to the second end of the driveshaft. In another embodiment, the whisk can include a second air path fluidly coupled to the air path of the driveshaft, and at least one mixing arm can be arranged perpendicular to the second air path. The mixing arm can include a third air path fluidly coupled to the second air path and an air outlet can be arranged at a distal end of the mixing arm.

In another embodiment, the fluid texturing device can include a steam injection tube extending through the housing. The steam injection tube can have a first end coupled to the first end of the housing and can be configured to couple to a steam source. The steam injection tube can also include a second end adjacent to the second end of the housing and can have an outlet for ejecting steam therefrom. The steam injection tube can be spaced from the driveshaft such that the outlet is spaced from the whisk. In another embodiment, the steam injection tube can pass through an aperture within a whisk cover positioned around the whisk. In another embodiment, the outlet of the steam injection tube can be positioned vertically above the whisk.

In another aspect, a beverage brewing apparatus is provided. In one embodiment, the beverage brewing apparatus can include a primary housing having a mounting arm with a connecting feature thereon. The beverage brewing apparatus can also include a fluid texturing device including a hollow secondary housing. The hollow secondary housing can have a mating portion configured to removably engage with the connecting feature on the primary housing for removably mating the fluid texturing device to the primary housing. The fluid texturing device can also include a driveshaft extending from the mating portion and through the hollow secondary body. The driveshaft can have a whisk mounted on an end thereof. The driveshaft can include an air path extending from the first end to the second end. The fluid texturing device can also include a coupling arranged within the driveshaft and axially movable within the driveshaft such that the coupling can variably block the air path to prevent a flow of air through the air path.

The beverage brewing apparatus can have a variety of configurations. For example, in some embodiments, the beverage brewing apparatus can include a steam injection tube extending from the mating portion and through the hollow secondary body. The steam injection tube can have an outlet configured to eject steam. The steam injection tube can be spaced apart from the driveshaft such that the outlet is spaced from the whisk. In another embodiment, a first electrical terminal on the connecting feature of the primary housing can be configured to contact a second electrical terminal on the mating portion of the hollow secondary housing. In another embodiment, the primary housing can have a fluid reservoir, a fluid outlet, and at least one heater configured to heat fluid flowing from the fluid reservoir to the fluid outlet. In another embodiment, a controller can be configured to detect attachment of the removable fluid texturing device to the primary housing.

BRIEF DESCRIPTION OF THE DRAWINGS

These and other features will be more readily understood from the following detailed description taken in conjunction with the accompanying drawings, in which:

FIG. 17A is a perspective view of the fluid texturing device of FIG. 14 shown in a disassembled configuration and shown in combination with a lid having an aperture extending there through;

Figure 1:
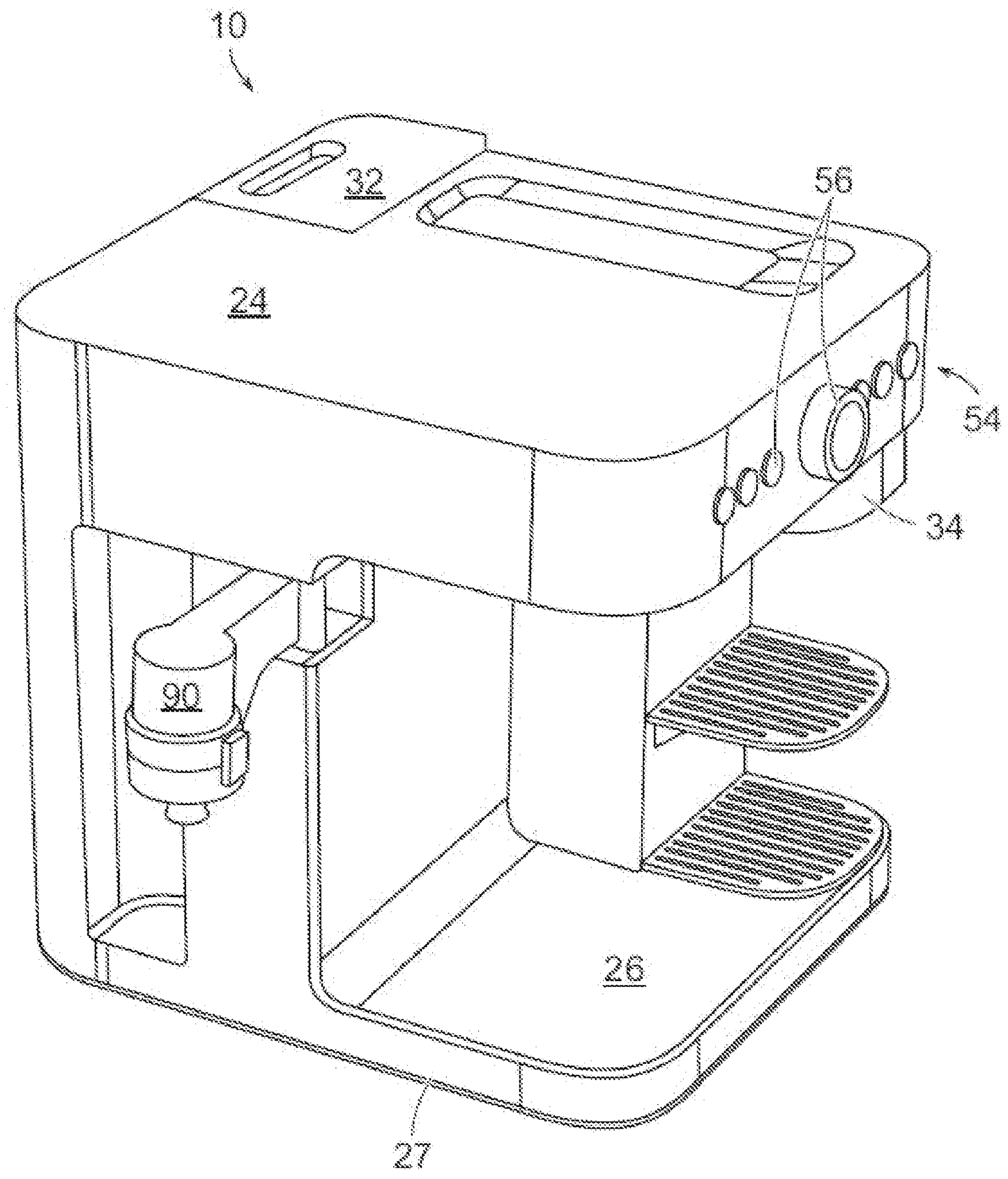
FIG. 1 is a front perspective view of one embodiment of a beverage brewing apparatus having a fluid texturing device coupled thereto.

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

In general, when injecting steam into milk, water is being added to a degree, which in turn is diluting the milk. If the steam pressure is low, the time required to heat the milk will be longer, leading to more water injection. Therefore, the steam injection speed will be slower resulting in a large bubble size, which corresponds to a poor milk texture. The result is not textured milk, but rather hot milk with some aerated foam on top, which greatly effects the taste of a milk based drink, as the milk does not integrate with espresso in this state. Additionally, with a low steam pressure, under heating of the milk can occur. In the alternative, if the steam pressure is too high, the time required to heat the milk will be shorter. Therefore, the steam injection speed will be faster resulting in a smaller bubble size, which corresponds to a desired high-quality milk texture. However, by using a high-pressure steam, overheating of the milk can occur, which could lead to an undesirable texture.

Accordingly, a device for texturing a fluid, such as milk, is provided. In an exemplary embodiment, the fluid texturing device solves the aforementioned issues by altering the whisk speed and direction to create different air and steam incorporation rates within a container during a texturing process. By altering the incorporation rates, the integration of steam and air into a fluid within the container can be varied while separately controlling the whisk speed. While rotating in a first rotational direction an air path is opened, allowing for the mixing of both air and steam being integrated into the fluid. While rotating in a second rotational direction the air path is closed, allowing only steam to be integrated into the fluid. In one aspect, after a specified time period, the whisk can change rotational directions to incorporate certain amounts of steam and air into a fluid. By changing the whisk speed and/or direction between different phases, the steam injection speed can be high, while also preventing overheating of the milk. Additionally, a temperature sensor can be positioned within the body of the texturing device to accurately measure the temperature of the fluid within the container as to not under or overheat the fluid to allow for the desired outcome as programmed by the user.

Figure 2:
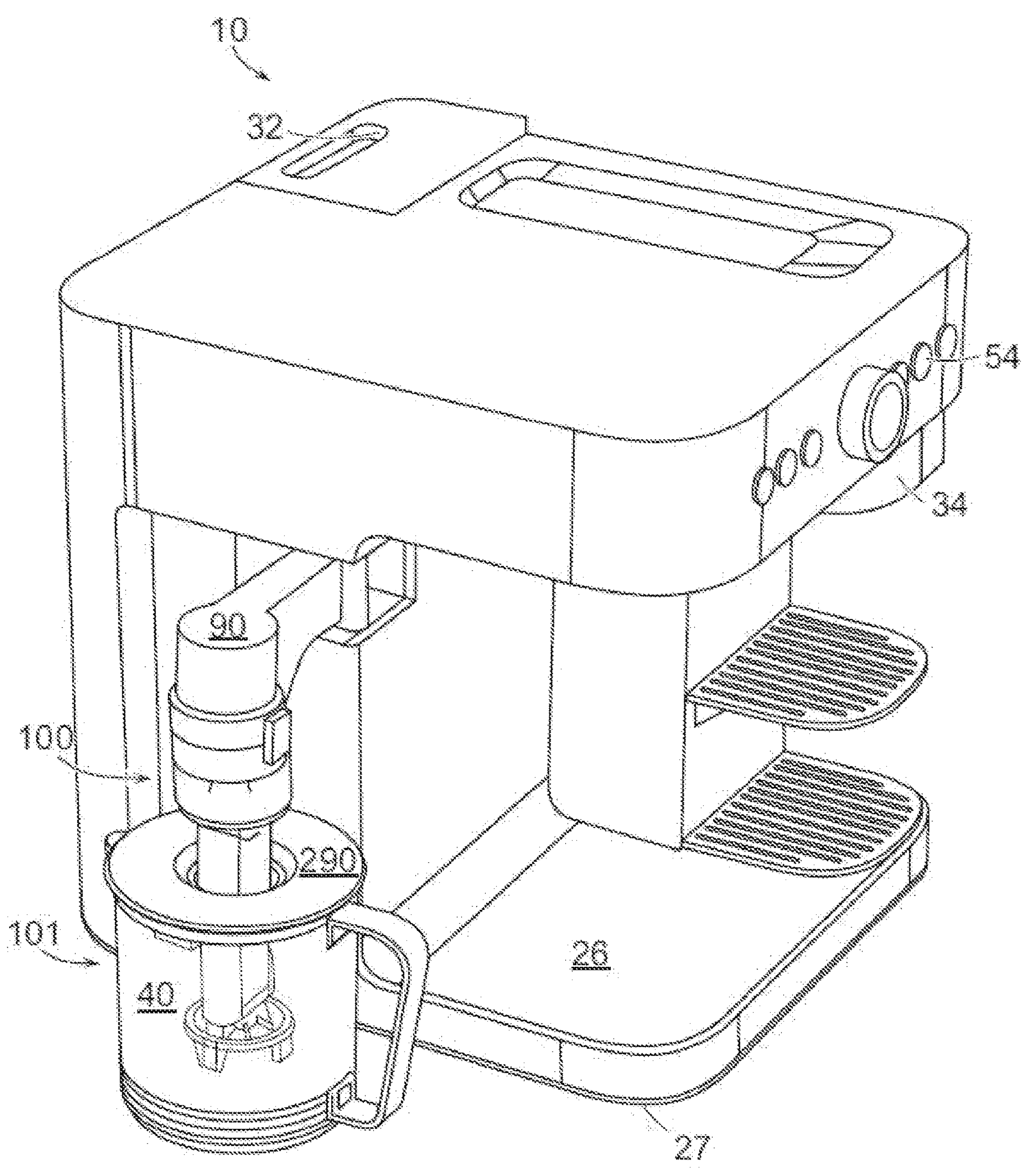
FIG. 2 is a front perspective view of the beverage brewing apparatus of FIG. 1 showing the fluid texturing device extending into a container.
Figure 3:
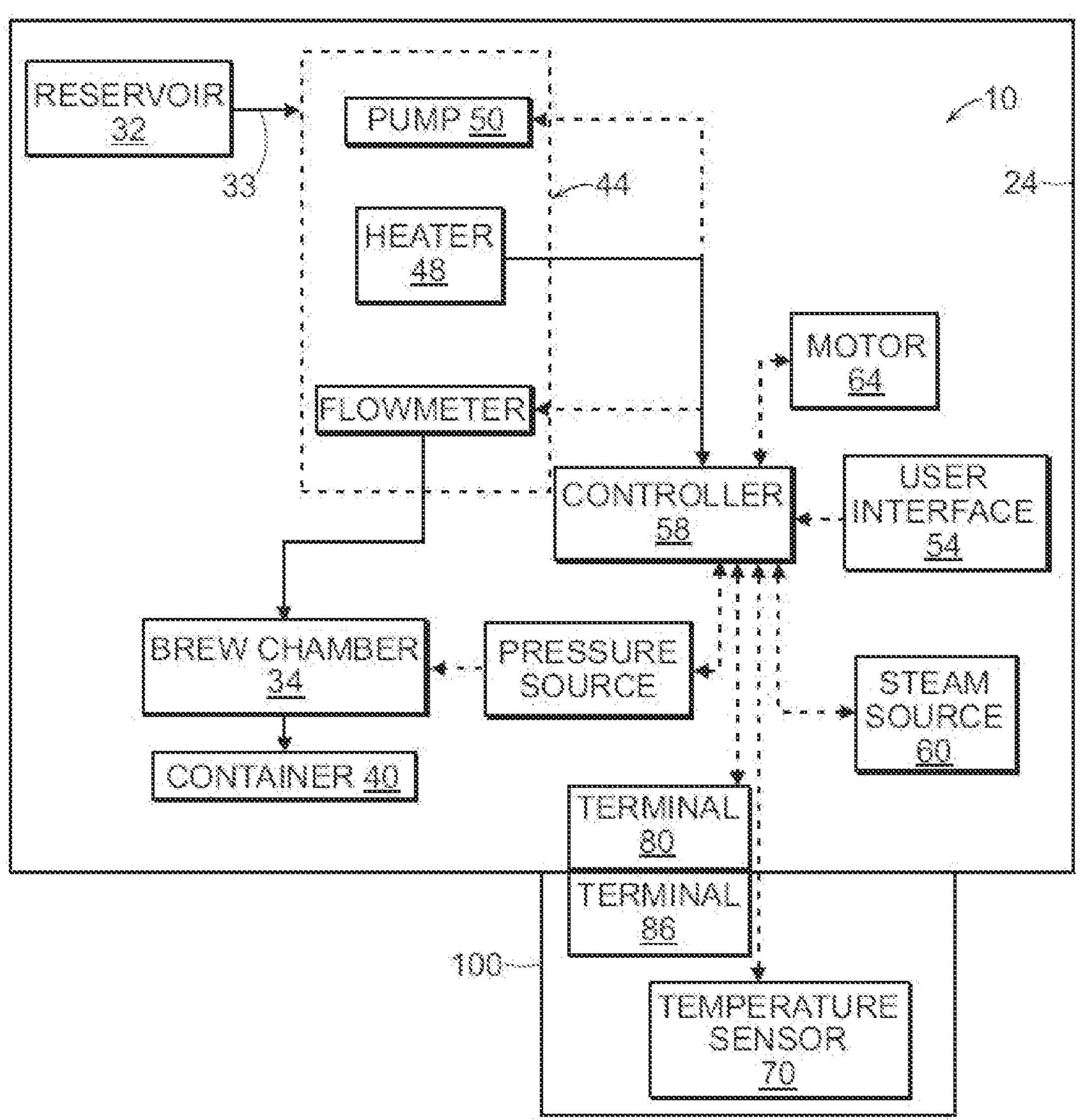
FIG. 3 is a schematic view of the internal components of the beverage brewing apparatus and fluid texturing device of FIG. 2.

FIGS. 1-3 illustrate one embodiment of a beverage brewing apparatus 10 operable to prepare a brewed beverage and suitable for use on a support surface, such as a countertop. A person skilled in the art will appreciate that the fluid texturing device disclosed herein can be used with any beverage brewing apparatus, and the illustrated apparatus is merely provided as one example of an apparatus for use with a fluid texturing device. As shown, the beverage brewing apparatus 10 generally includes a housing 24 having a base 26. A bottom surface 27 of the base 26 can be configured to be positioned on a support surface, such as a countertop. An upper surface of the base 26 can define an area for positioning a container configured to receive a brewed beverage output from the beverage brewing apparatus 10.

The beverage brewing system can also include a reservoir 32 arranged on the housing 24 and configured to store a desired amount of fluid therein, such as water, for brewing a beverage including but not limited to coffee or tea. The reservoir 32 can be removably connectable to the housing 24 for ease of filling. The housing 24 can also include a brew chamber 34 within which a flavorant, such as coffee grinds or tea leaves, may be positioned.

A fluid delivery system 44 is disposed within the housing 24 and is configured to communicate fluid from the reservoir 32 to the brew chamber 34. The fluid delivery system 44 can include at least one fluid supply line 33 or conduit extending between an outlet end of the reservoir 32 to an inlet of the brew chamber 34. The fluid delivery system 44 can also include a heater 48 operable to heat the water supplied from the reservoir 32 to a desired temperature prior to delivery to the brew chamber 34. Additionally, the fluid delivery system 44 can include a pumping mechanism 50 operable to provide a positive pumping action to push or draw a fluid, such as water, from the reservoir 32 through the at least one fluid supply line 33 and the heater to deliver the fluid to the brew chamber 34.

As further shown in FIG. 1, the beverage brewing apparatus 10 can include a user interface 54 for receiving one or more inputs from a user. The user interface 54 is formed at a portion of the housing 24, such as at a front surface adjacent the brew chamber 34. While the user interface 54 is shown on the front face of the housing 24, the user interface 54 can be located anywhere on the housing and the position can vary depending on the configuration of the beverage brewing apparatus 10. The user interface 54 can include one or more buttons, knobs, or other control input devices 56. Alternatively, or in addition, the user interface 54 can include a touch screen, or it can be configured to receive an input via from a smart device, such as a phone or tablet for example, via an "app" or other suitable connection. The operation of the user interface will be described in detail below.

Operation of the beverage brewing apparatus 10 can be controlled by a controller 58 operably coupled to the components of the beverage brewing apparatus 10, and configured receive one or more input signals from the user interface 54. The controller 58 can include one or more of a microprocessor, microcontroller, application specific integrated circuit (ASIC), or any other form of electronic controller known in the art.

A person skilled in the art will appreciate that the beverage brewing apparatus can have a variety of other configurations and can include various features, and that the illustrated beverage brewing apparatus is merely one exemplary embodiment. Other example embodiments of beverage brewing apparatuses are disclosed in U.S. Pat. No. 11,246,446, which is hereby incorporated by reference in its entirety.

In addition to having the necessary components for producing a brewed beverage, the beverage brewing apparatus 10 can also have a mounting arm 90 movably coupled to the housing 24 for mounting a fluid texturing device 100 onto the housing. In the illustrated embodiment, the mounting arm 90 is positioned on a side of the housing, however the mounting arm 90 can be positioned at various other locations.

Figure 4:
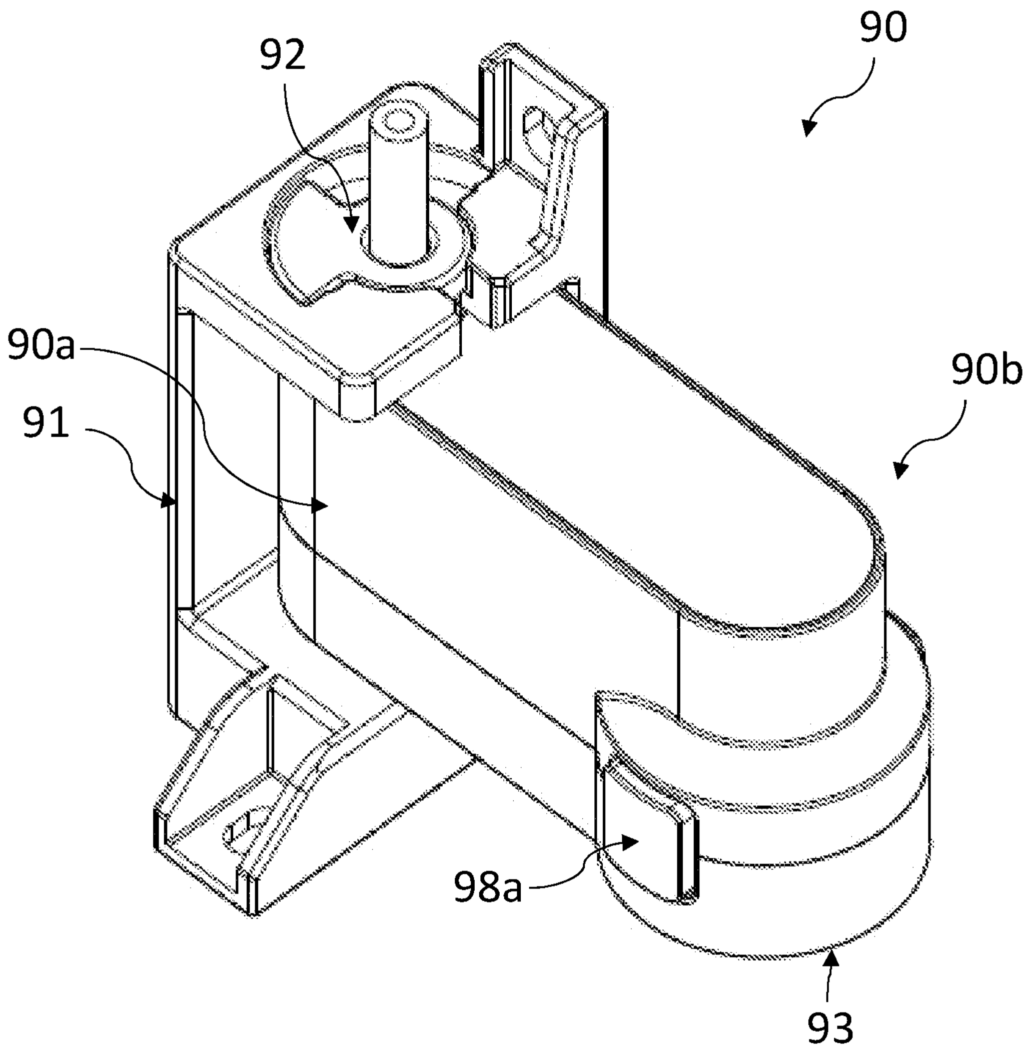
FIG. 4 is a top perspective view of a mounting arm of the beverage brewing apparatus of FIG. 1 in an operational position.
Figure 5:
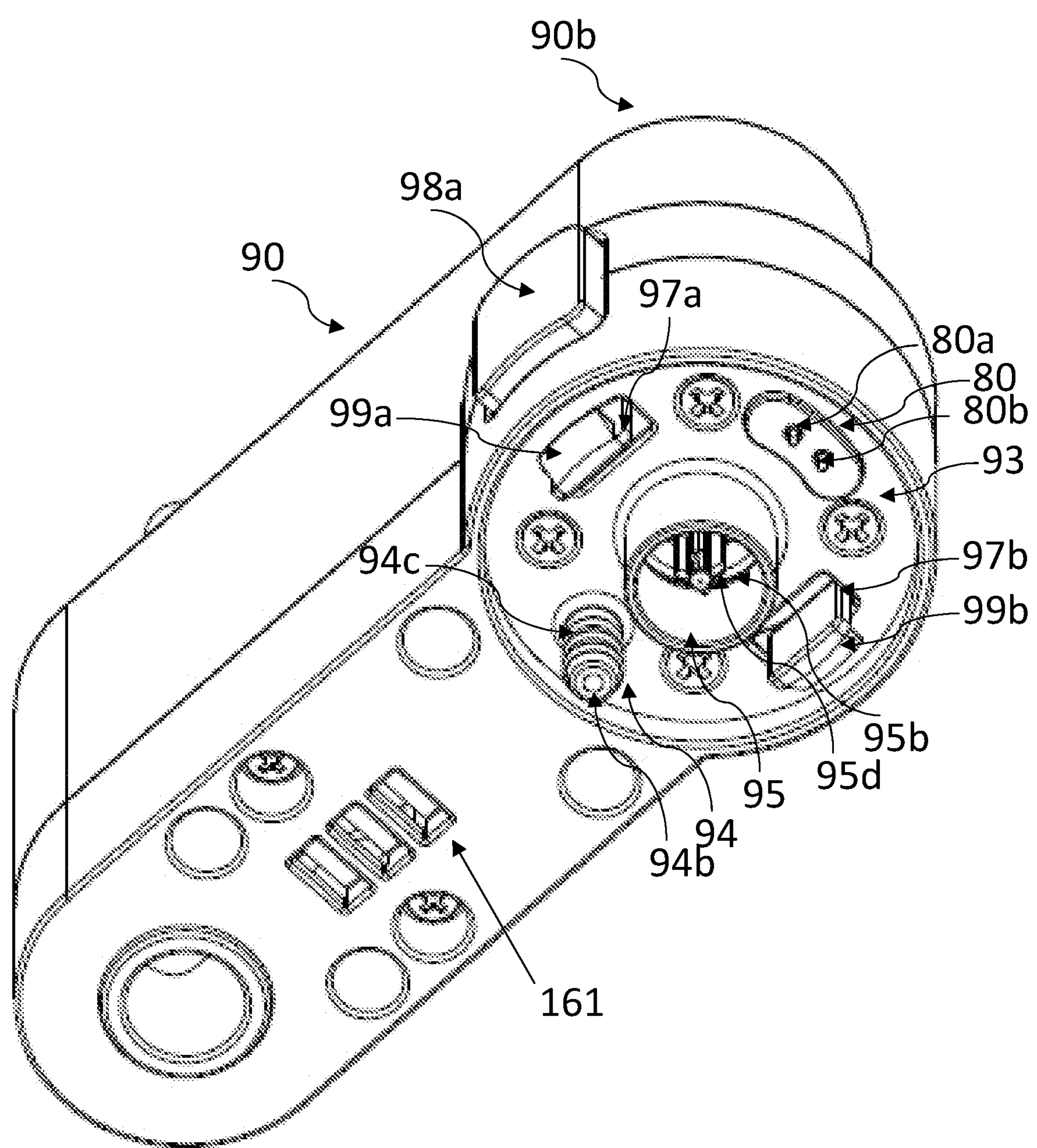
FIG. 5 is a bottom perspective view of the mounting arm of FIG. 4.
Figure 6:
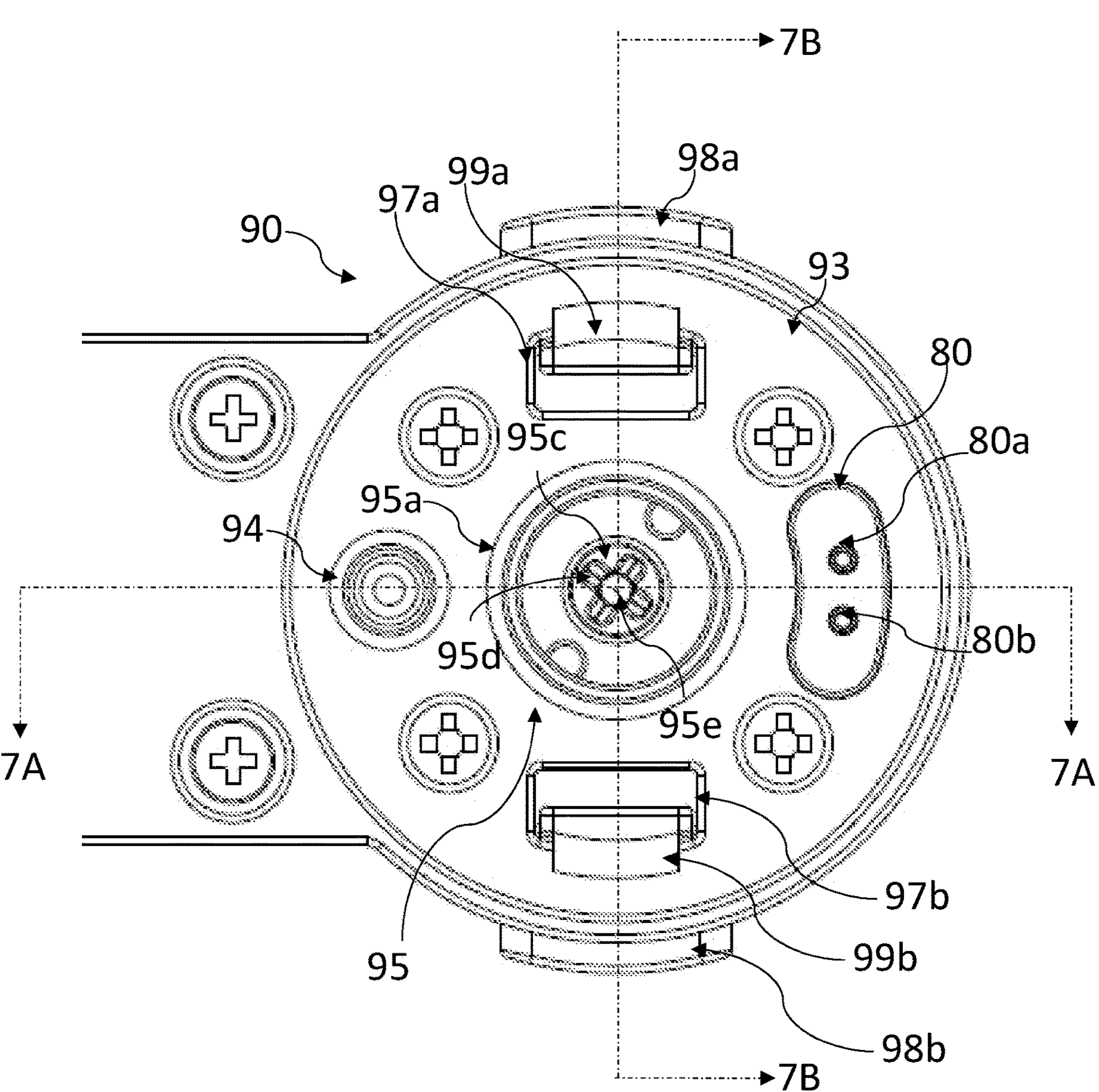
FIG. 6 is a bottom view of the mounting arm of FIG. 4.

As shown in more detail in FIGS. 4-6, the mounting arm 90 can have a generally elongate configuration with a first end 90*a* and a second end 90*b*. The first end 90*a* can be pivotally secured to a frame 91 at a pivot joint 92. The frame 91 can be arranged within the housing 24 and it can be configured to allow the mounting arm 90 to pivot between a storage position and an operational position. In the storage position, the mounting arm 90 is pivoted to be flush and/or to abut the housing 24, and in the operational position, the mounting arm 90 extends from the housing at a sustainably perpendicular angle to allow for a container to be arranged underneath a fluid texturing device 100 connected to the mounting arm 90.

The second end 90*b* of the mounting arm 90 can include a mating face 93 that defines a connecting feature. The connecting feature can have various input and output ports for passing material and signals to and from the fluid texturing device 100. The mating face 93 is configured to face downward and be perpendicular with a support surface such that the fluid texturing device 100 extends in a vertical direction when connected to the mounting arm 90. The various input and output ports on the mating face 93 of the mounting arm 90 can include a steam injection port 94, a driveshaft port 95, and an electric terminal 80. As shown in FIG. 6, the driveshaft port 95 can be arranged in the center of the mating face 93, and the steam injection port 94 and the electric terminal 80 can be radially spaced from the driveshaft port 95. Additionally, the mating face 93 can include features which are configured to selectively engage the fluid texturing device 100 to retain the fluid texturing device 100 on the mounting arm 90.

Figure 7A:
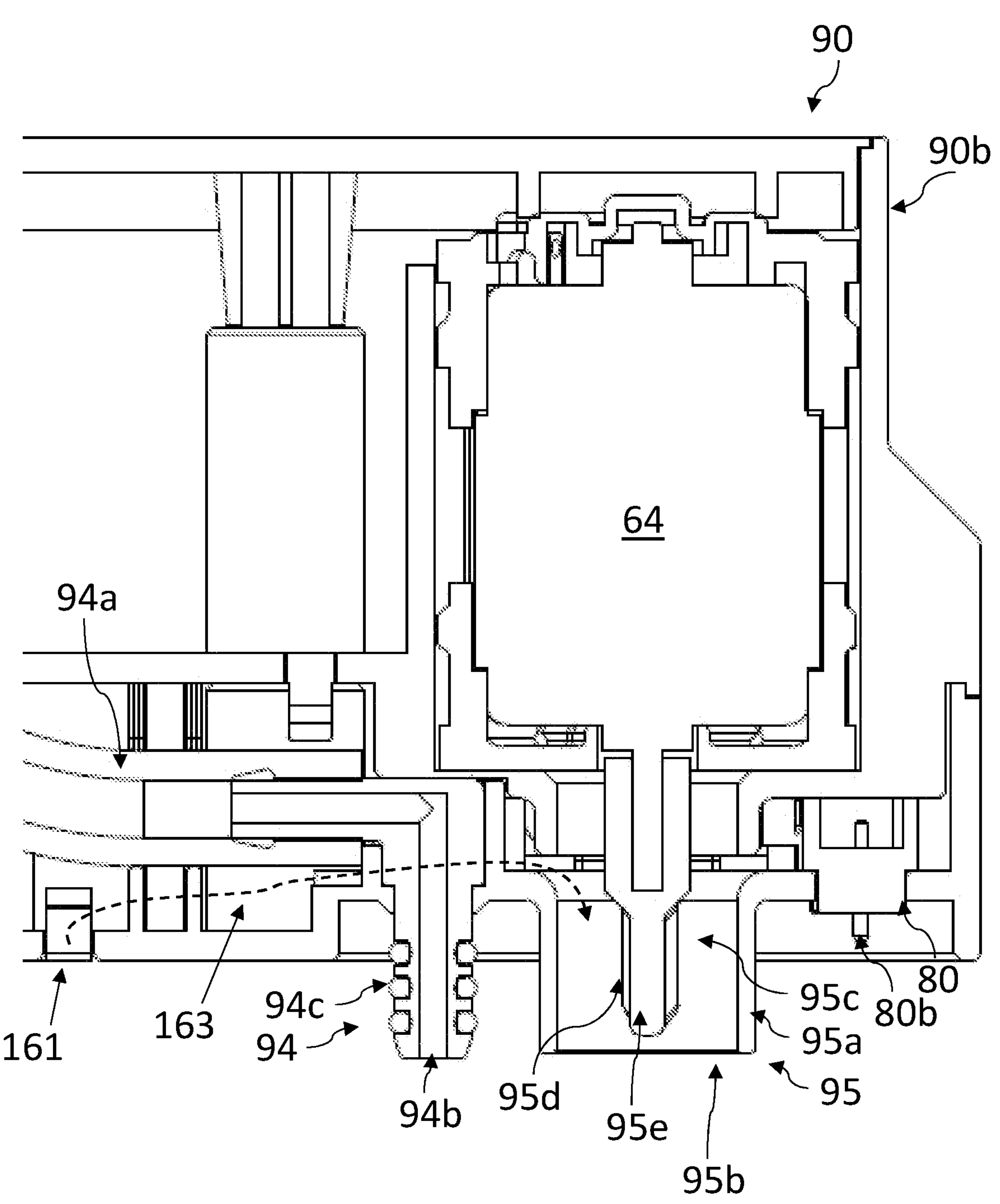
FIG. 7A is a cross-sectional side view of the mounting arm of FIG. 6 taken along line 7A-7A in FIG. 6.

The steam injection port 94 is shown in more detail in FIG. 7A and includes a tube 94*a* position within and extending through the mounting arm 90. The tube 94*a* extends outward and vertically downward from the mating face 93 and has an outlet 94*b* at a terminal end thereof. As steam exits the outlet 94*b*, steam will enter a steam injection tube of the fluid texturing device 100, which will be explained in more detail below. The outlet 94*b* can include a seal 94*c* arranged on the outer surface of the outlet 94*b* to help seal the outlet 94*b* with the steam injection tube of the fluid texturing device 100. In certain aspects, the seal 94*c* can formed from a deformable silicon material, but other types of seals are considered within the scope of this disclosure.

In order to produce steam at the fluid texturing device 100, the tube 94*a* can be configured to couple to a steam source 60 arranged within the housing 24, as shown in FIG. 3. The steam source 60 can be integral with the heater 48 or it can be a separate unit, and it can be configured to produce steam and transport that steam through the tube 94*a* to an outlet 94*b*. The steam source 60 can be in communication with the controller 58, which controls the amount and temperature of steam produced by the steam source 60. In certain aspects, the steam generated by the steam source 60 can be dry steam produced by heating the water contained within the reservoir 32. A pump can be used to move the steam from the steam source 60 to the steam injection port 94, or the pressure of the steam itself can be sufficient to move the steam from the steam source 62 the steam injection port 94.

Figure 7B:
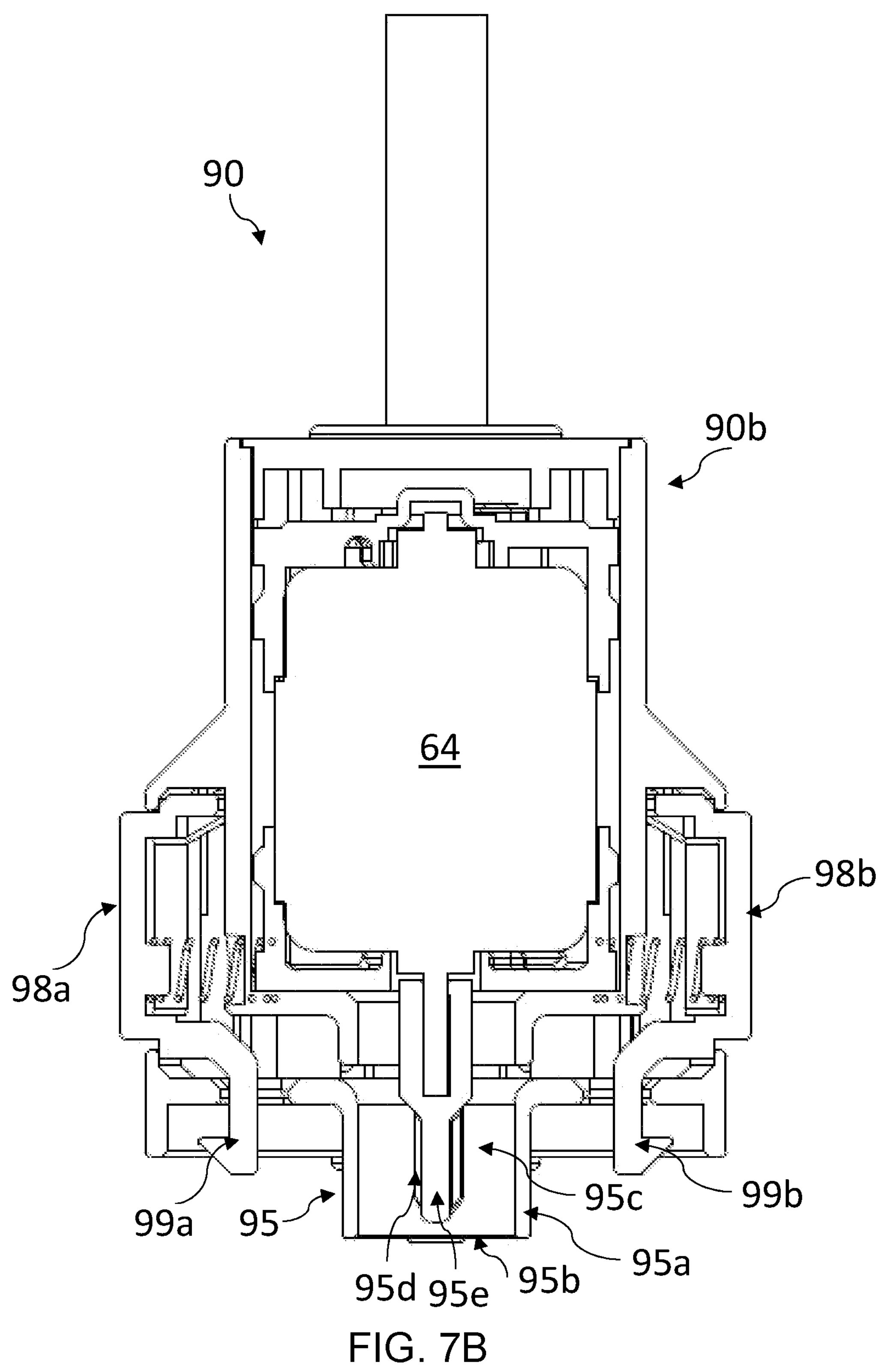
FIG. 7B is a cross-sectional side view of the mounting arm of FIG. 6 taken along line 7B-7B in FIG. 6.

As indicated above, the driveshaft port 95 is also arranged on the mating face 93 and it is configured to transmit rotational motion to the fluid texturing device 100. As illustrated in FIG. 7B, the driveshaft port 95 includes a hollow body 95*a* that extends outward from the mating face 93 and that has an aperture 95*b* arranged therein. A drive feature 95*c* is arranged within the hollow body 95*a* and is configured to drive rotational motion of a driveshaft of the fluid texturing device 100 when the fluid texturing device 100 is connected to the mounting arm 90, as will be explained in more detail below. In the illustrated embodiment, the drive feature 95*c* is in the form of multiple tabs, e.g., four tabs, that abut corresponding tabs on the driveshaft of the fluid texturing device 100. The tabs 95*d* can project outward radially from a central shaft 95*e* of the drive feature 95*c* and can be oriented in a vertical direction along the internal surface of the hollow body 95*a* of the driveshaft port such that a driveshaft of the fluid texturing device 100 can be removed and replaced relative to the mounting arm 90 in the vertical direction, while still allowing for rotational motion to be transferred from the drive feature 95*c* to the driveshaft of the fluid texturing device 100. While four tabs are shown in the figures, more or less tabs would be sufficient and considered within the scope of this disclosure. The hollow body 95*a* can be connected to the driveshaft of a motor 64 arranged in the second end 90*b* of the mounting arm 90 such that the motor 64 can rotate the hollow body 95*a*. The motor 64 can be connected to the controller 58, which controls the rotational speed of the motor 64. In certain embodiments, the motor 64 can be a DC variable speed motor, where the controller 58 controls the output speed depending on a desired fluid texture, as explained in more detail below.

As further show in FIGS. 5-7B, an electrical terminal 80 can be arranged on one side of the driveshaft port 95 opposite to the steam injection port 94. The illustrated electric terminal 80 includes pogo pins 80*a*, 80*b*, which are configured to contact corresponding electrical contacts on the fluid texturing device 100, explained in more detail below. The pogo pins 80*a*, 80*b* extend downward from the mating face 93 and can retract vertically into the mating face 93 when contacting corresponding electrical contacts on the fluid texturing device 100. The pogo pins 80*a*, 80*b* are connected to the controller 58 and may be configured to send signals to the controller 58 based on various operating conditions of the fluid texturing device 100, such as the temperature of the fluid surrounding the fluid texturing device 100, the speed of the whisk, or the connection status of the fluid texturing device 100. Even though the electric terminal 80 is represented as having multiple pogo pins, any type of electrical connector would be sufficient and considered within the scope of this disclosure.

As indicated above, the mounting arm 90 can also include a mating feature configured to removably engage the fluid texturing device to retain the device on the brewing apparatus. In the illustrated embodiment, the mating feature is in the form of tabs 99*a*, 99*b* that project outward from the mating face 93 and that are configured to engage with corresponding connecting features within the fluid texturing device 100, which will be explained in more detail below. The illustrated tabs 99*a*, 99*b* extend through slots 97*a*, 97*b* in the mating face and are deflectable to allow the tabs 99*a*, 99*b* to move radially inward and outward. Buttons 98*a*, 98*b* can be arranged on the exterior surface of the second end 90*b* of the mounting arm 90 and can be integral with or connected to the tabs 99*a*, 99*b*. The buttons 98*a*, 98*b* can be spring biased outward such that the tabs 99*a*, 99*b* are likewise biased radially outward, thus retaining the fluid texturing device on the brewing apparatus. During attachment of the fluid texturing device to the mounting arm, the device can cause the tabs 99*a*, 99*b* to deflect radially inward and once fully connected, the tabs will return to the radially outward position. Further, a force can be applied to the buttons 98*a*, 98*b* to move the buttons radially inward to cause the tabs 99*a*, 99*b* to move radially inward, thereby releasing the fluid texturing device 100 from the mating face 93.

As stated above, the fluid texturing device 100 is configured to be removably arranged on the mounting arm 90. An exemplary embodiment of a fluid texturing device 100 is illustrated in FIGS. 8-10B. As shown, the fluid texturing device 100 generally includes a hollow elongate housing 102 having steam injection tube 118 and a driveshaft 116 extending therethrough. The driveshaft 116 can be coupled to the drive feature 95*c* via a coupling 117. For example, the tabs 95*d* can be received within the coupling 117 at a first end of the coupling 117. The driveshaft 116 can be attached to the coupling 117 at a second end that is opposite to the first end. The steam injection tube 118 is configured to deliver steam to a fluid, and the driveshaft 116 includes a whisk 140 on the terminal end thereof for mixing the fluid.

The housing 102 can have a variety of configurations, but in the illustrated embodiment the hollow elongate housing has a first end 102*a* and a second end 102*b*. The first end 102*a* can have a mating portion that allows multiple inputs and outputs of the fluid texturing device to communicate with the components within the beverage brewing apparatus 10, and the second end 102*b* can interact with the fluid. In the illustrated embodiment, the first end 102*a* is generally circular while the second end 102*b* has an oval-shaped cross-section, and the portion of the housing 102 extending there between has an oval-shaped cross-section.

The mating portion of the housing 102 can include various features for mating with the connecting features on the mounting arm of the beverage dispensing apparatus. In particular, similar to mating face 93, the housing 102 can have a mating face 106 that includes a steam injection port 110, a driveshaft port 112, an electric terminal 86, and mating grooves 114*a*, 114*b*, each of which will be discussed in more detail below. The mating face 106 can also include mating grooves 114*a*, 114*b* arranged on opposite sides of the driveshaft port 112, and configured to receive the corresponding tabs 99*a*, 99*b* on the mounting arm.

The steam injection port 110 is configured to fluidly mate with the steam injection port 94 on the mounting arm in order to transfer steam from the steam source 60 within the housing 24 through the steam injection tube 118, which extends from the first end 102*a* of the housing 102 to the second end 102*b* of the housing. The steam injection tube 118 can be in the form of a circular tube having an inner lumen that allows steam to pass from the steam injection port 110 to an outlet 122 arranged within a tip 120. In certain aspects, the steam injection tube 118 or the inner lumen thereof can be tapered from the first end 102*a* to the second end 102*b*. The tapered configuration can aid in reducing back pressure as steam travels along the steam injection tube 118. The tip 120 can be positioned adjacent the second end 102*b* of the housing 102 for ejecting steam into a fluid. In one embodiment, the tip 120 can be formed from a separate component that is screwed onto the steam injection tube 118. However, in other aspects it can be integral with the tube 118. A person skilled in the art will appreciate that the steam injection tube can be in the form of a lumen extending through and integrally formed with the housing, and need not be in the form of a separate tube extending through the housing.

Figure 13:
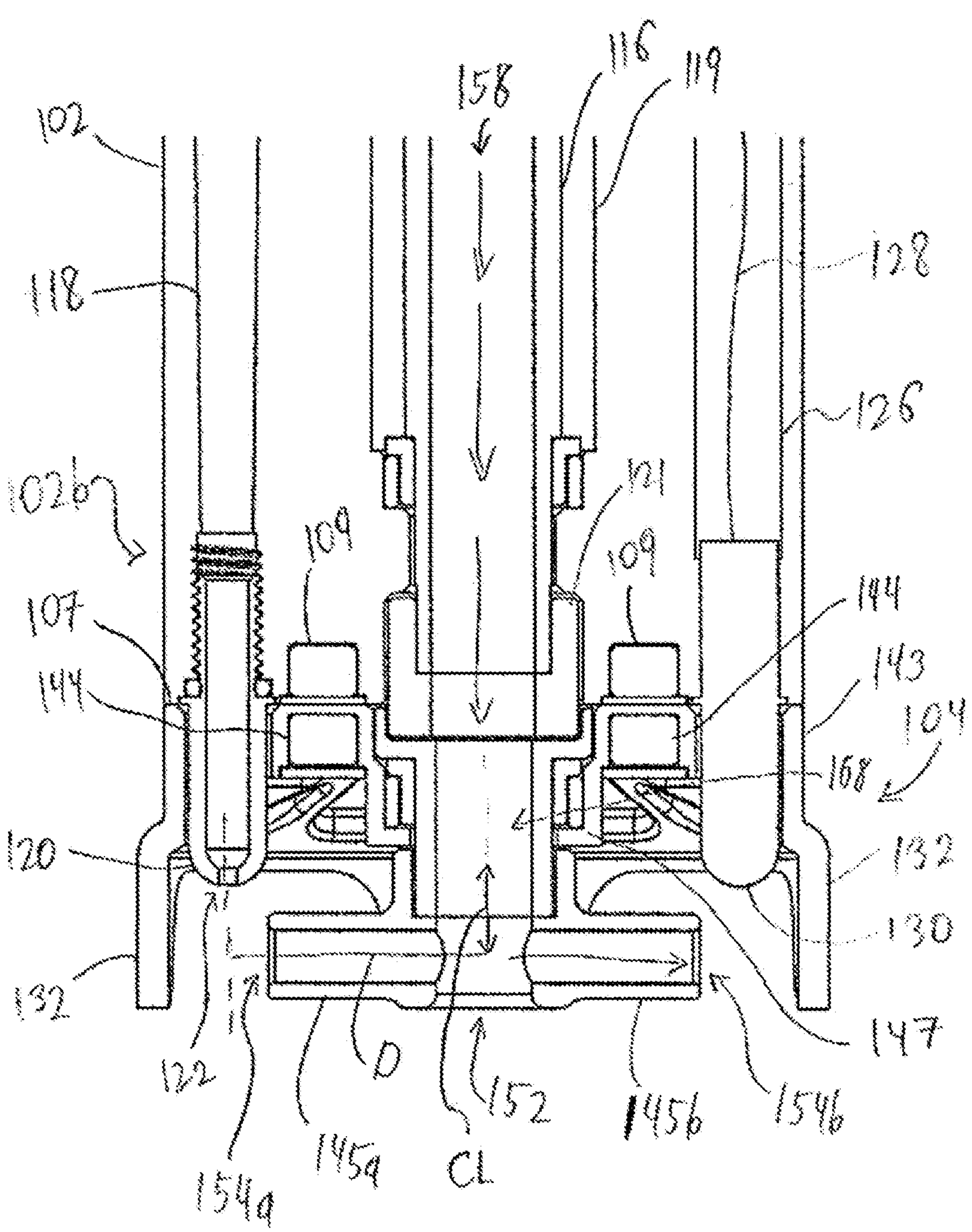
FIG. 13 is a detailed cross-sectional side view of the fluid texturing device of FIG. 9.
Figure 15:
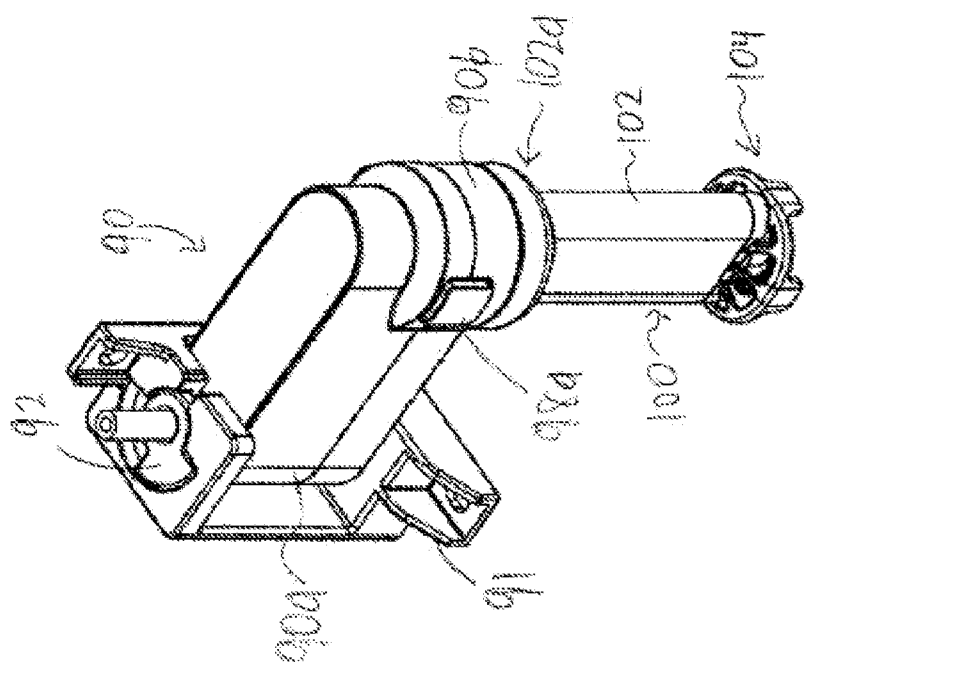
FIG. 15 is a top perspective view of the fluid texturing device of FIG. 14 connected to the mounting arm.

The position of the steam injection tube 118 and the tip 120 can vary to control the impact on fluid, as will be discussed in further detail below. In one embodiment, the steam injection tube 118 is spaced a distance from the driveshaft 116 to position the tip 120 and outlet 122 a distance apart from the whisk. In one embodiment, as shown in FIG. 13, a distance D between the tip 120 and the driveshaft 116, is 14.46 mm. Additionally, in some embodiments, the tip 120 can spaced from the driveshaft 116, extending along a centerline CL, at different distances in a range of about 5.00 mm to 32.00 mm. In one aspect, a distance D between the tip 120 and the driveshaft 116 is 6.00 mm such that the tip 120 is configured to inject steam inside an inner most portion of the whisk 140. In another aspect, a distance D between the tip 120 and the driveshaft 116 is 14.46 mm such that tip 120 is configured to eject steam radially between an outer most portion of the whisk 140 and an inner most portion of the whisk cover 143. In another aspect, a distance D between the tip 120 and the driveshaft 116 is 30.00 mm such that the tip 120 is configured to eject steam radially outside of an outer most portion of the whisk cover 143. Further, the tip 120 of the tube 118 can be arranged to be positioned vertically above the whisk 140 to better incorporate air and steam into a fluid being agitated by the whisk 140, as will also be explained in more detail below.

Figure 8:
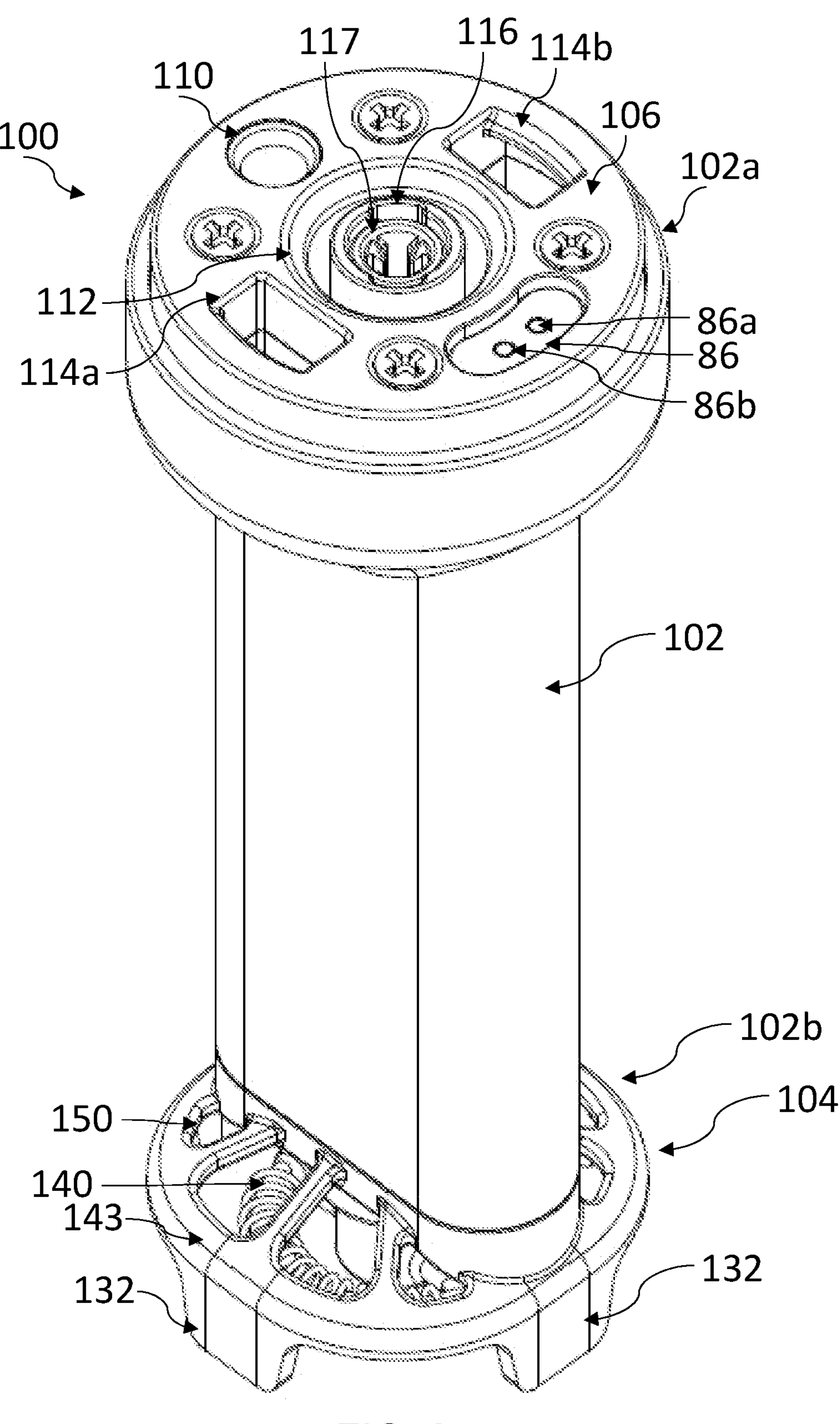
FIG. 8 is a top perspective view of the fluid texturing device of FIG. 2 detached from the beverage brewing apparatus.
Figure 9:
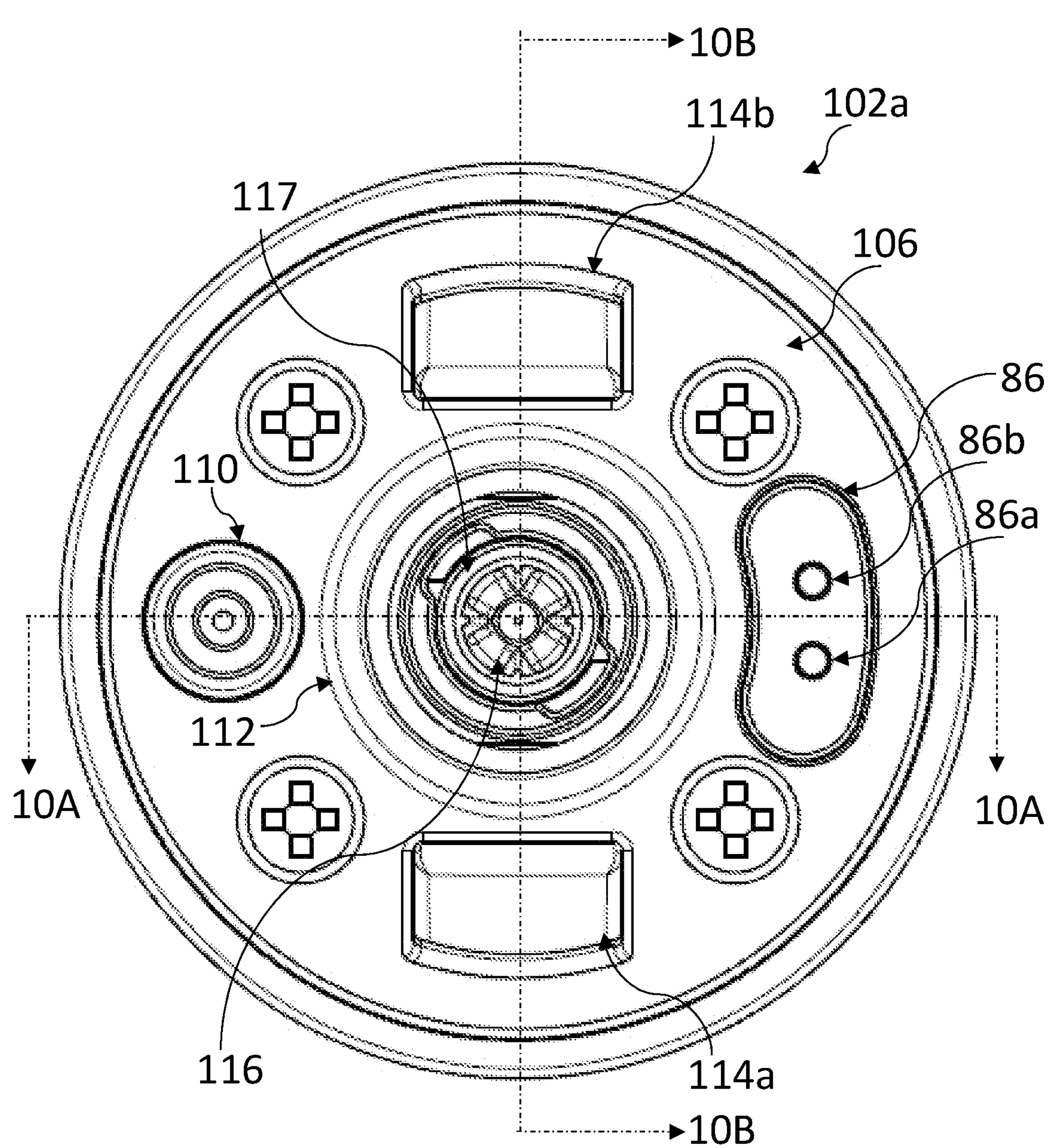
FIG. 9 is a top view of the fluid texturing device of FIG. 8.
Figure 10A:
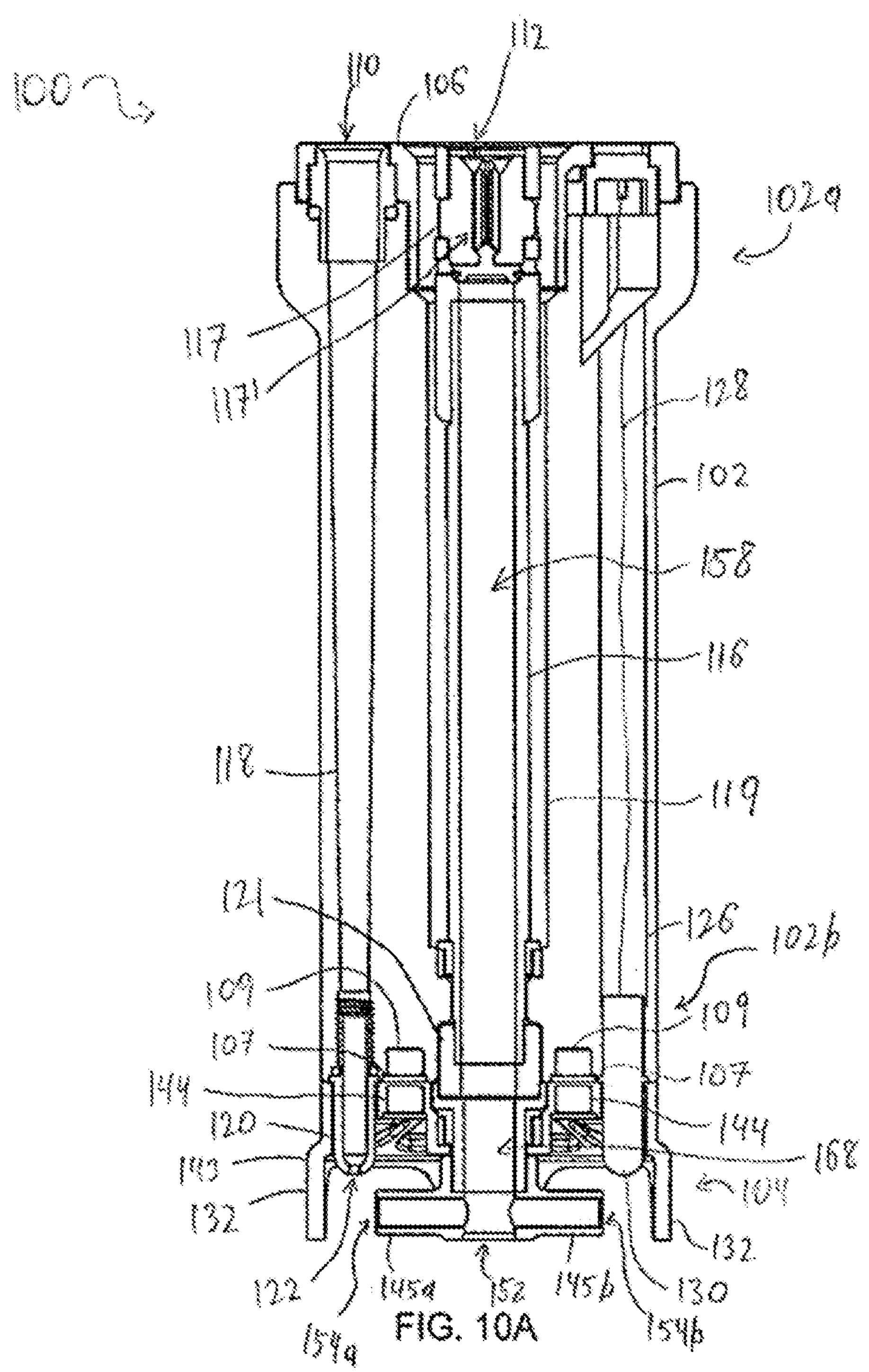
FIG. 10A is a cross-sectional side view of the fluid texturing device of FIG. 9 taken along line 10A-10A in FIG. 9.

As further shown in FIGS. 8 and 9, the mating face 106 can also include an electrical terminal 86 arranged thereon and positioned on a side of the driveshaft port 112 that is opposite to the steam injection port 110. Similar to the electrical terminal 80 on the mating face 93, the electrical terminal 86 on the mating face 106 of the fluid texturing device 100 can include pogo pins 86*a*, 86*b*, which correspond to the pogo pins 80*a*, 80*b*. When the fluid texturing device 100 is connected to the mounting arm 90, pogo pins 80*a*, 80*b* contact pogo pins 86*a*, 86*a* such that signals from the temperature sensor 130 can be sent to the controller 58 within the housing 24 of the beverage brewing apparatus 10. A tube 126, as shown in FIG. 10A, can extend from the electrical terminal to the second end 102*b* of the housing 102. A person skilled in the art will appreciate that the tube can be in the form of a lumen integrally formed with the housing, and that it need not be a separate component. The tube 126 can be configured to carry a wire 128 there through for transferring signals from the electrical terminal 86 to a temperature sensor 130 arranged adjacent to the outlet of the tube 126. In certain aspects, the temperature sensor 130 can be a negative temperature coefficient (NTC) sensor, which can detect a temperature of fluid surrounding the temperature sensor 130. The temperature sensor 130 can extend outward and vertically downward from the housing 102, similar to the tip 120.

Figure 16A:
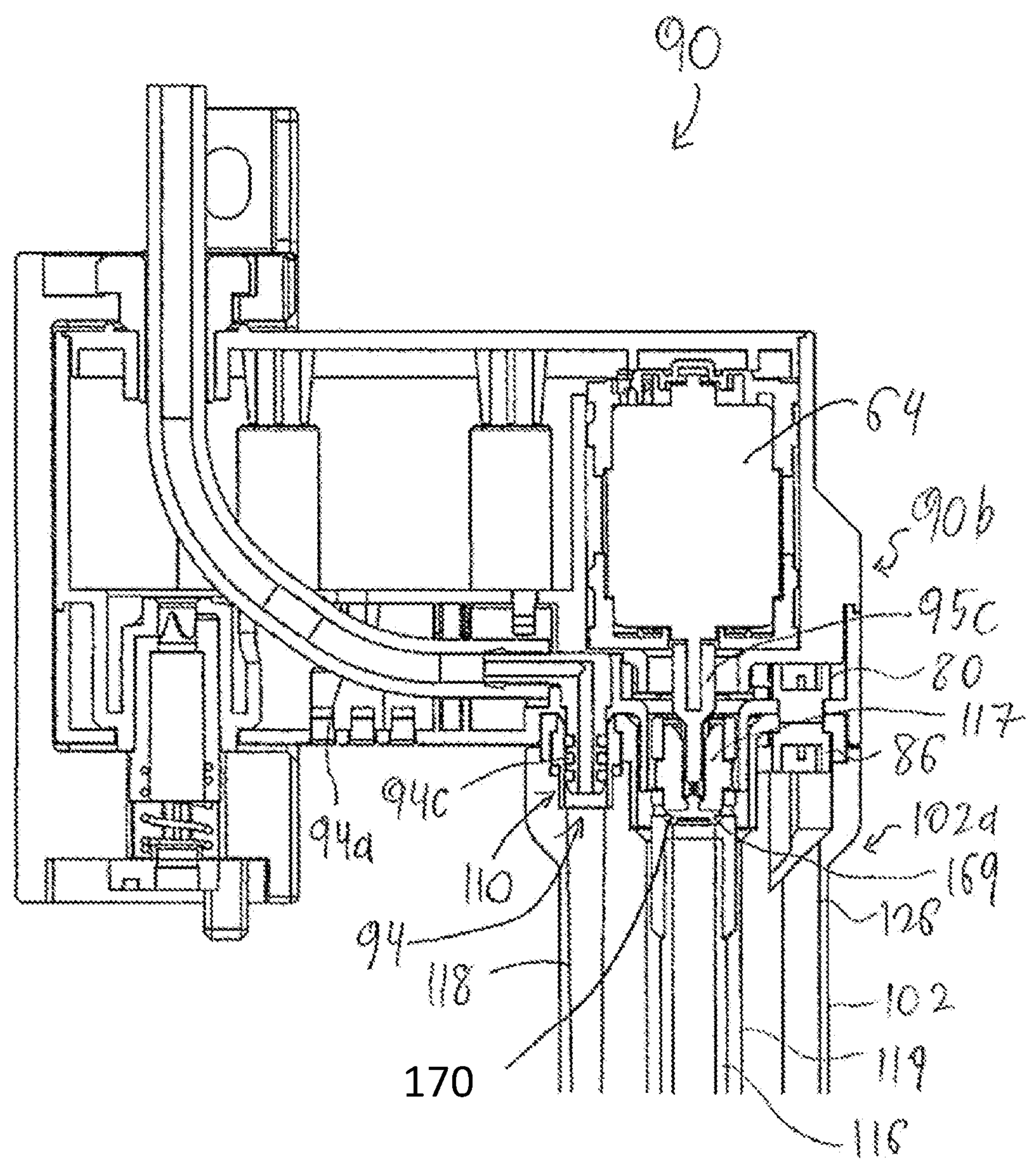
FIG. 16A is a detailed cross-sectional side view of the mounting arm and fluid texturing device of FIG. 15.
Figure 16B:
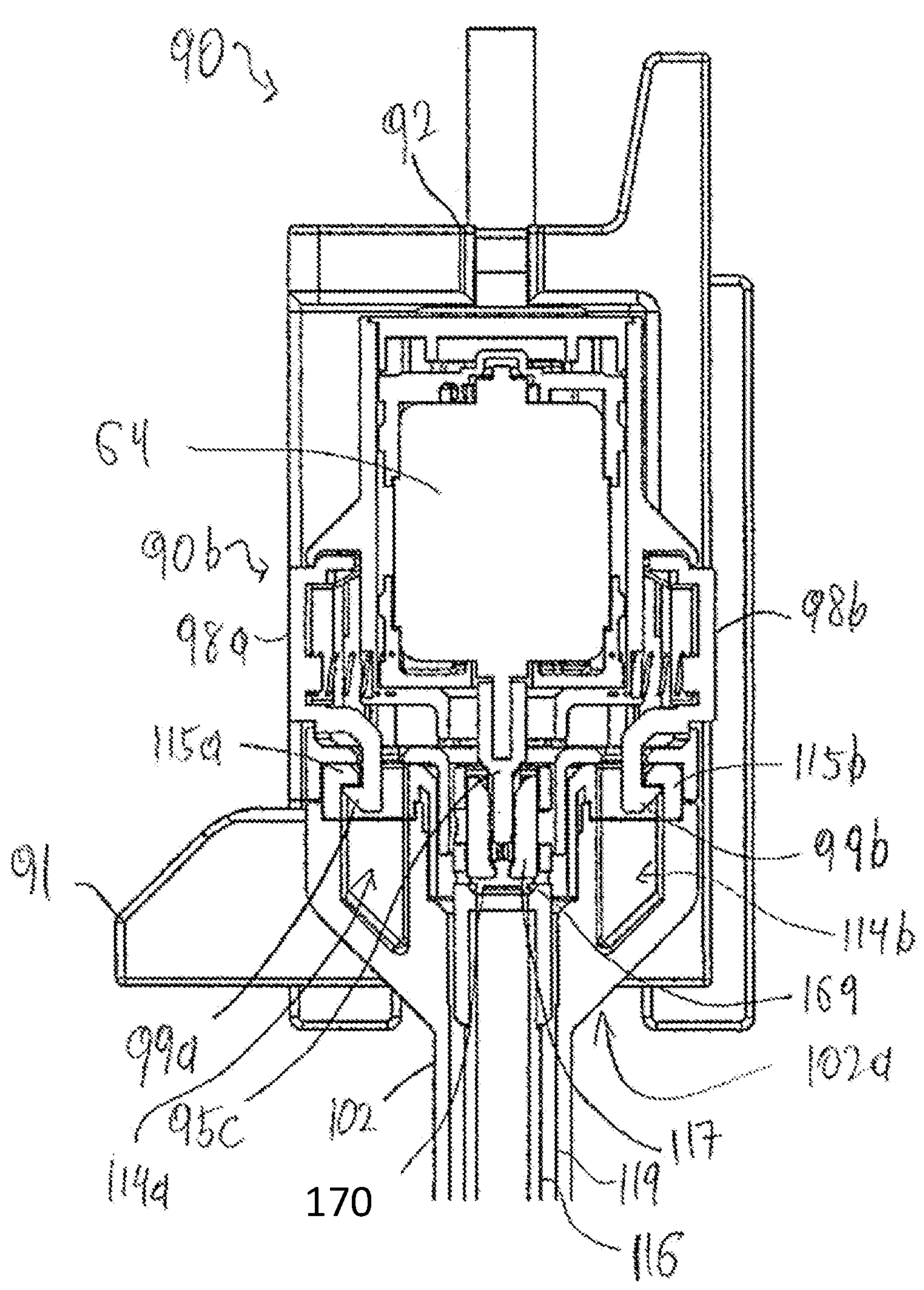
FIG. 16B is a detailed cross-sectional side view of the mounting arm and fluid texturing device of FIG. 15.

As indicated above, the mating face 106 of the fluid texturing device 100 can also include a driveshaft port 112 arranged centrally within the housing 102. The coupling 117 can extend into the driveshaft port 112. The driveshaft 116 can be mounted within the driveshaft port 112, via the coupling 117, such that it is configured to receive rotational motion from the motor 64 arranged within the mounting arm 90. The coupling 117 and/or the driveshaft 116 is secured within the housing by snap rings which are positioned such that the driveshaft 116 is prevented from moving in the vertical axis. The driveshaft 116 can extend through the housing 102 from the first end 102*a* to the second end 102*b*. In certain aspects, the driveshaft 116 can be parallel to both the steam injection tube 118 and tube 126. In order to allow rotational motion to be transmitted to the driveshaft 116, the coupling 117 can include one or more slots 117' at the first end 102*a*. The end portion of the driveshaft having the slots 117' can extend into the driveshaft port 112 and can receive tabs 95*d* of the drive feature 95*c*. When the fluid texturing device 100 is mated to the mounting arm, the driveshaft port 95 on the mounting arm will extend into the driveshaft port 112 on the fluid texturing device 100 as illustrated in FIGS. 16A-16B, such that the tabs 95*d* are positioned within the slots 117'. As a result, the slots 117' on the driveshaft 116 can contact the tabs 95*d* on the mounting arm to allow the driveshaft 116 to be rotatably driven.

Figure 10B:
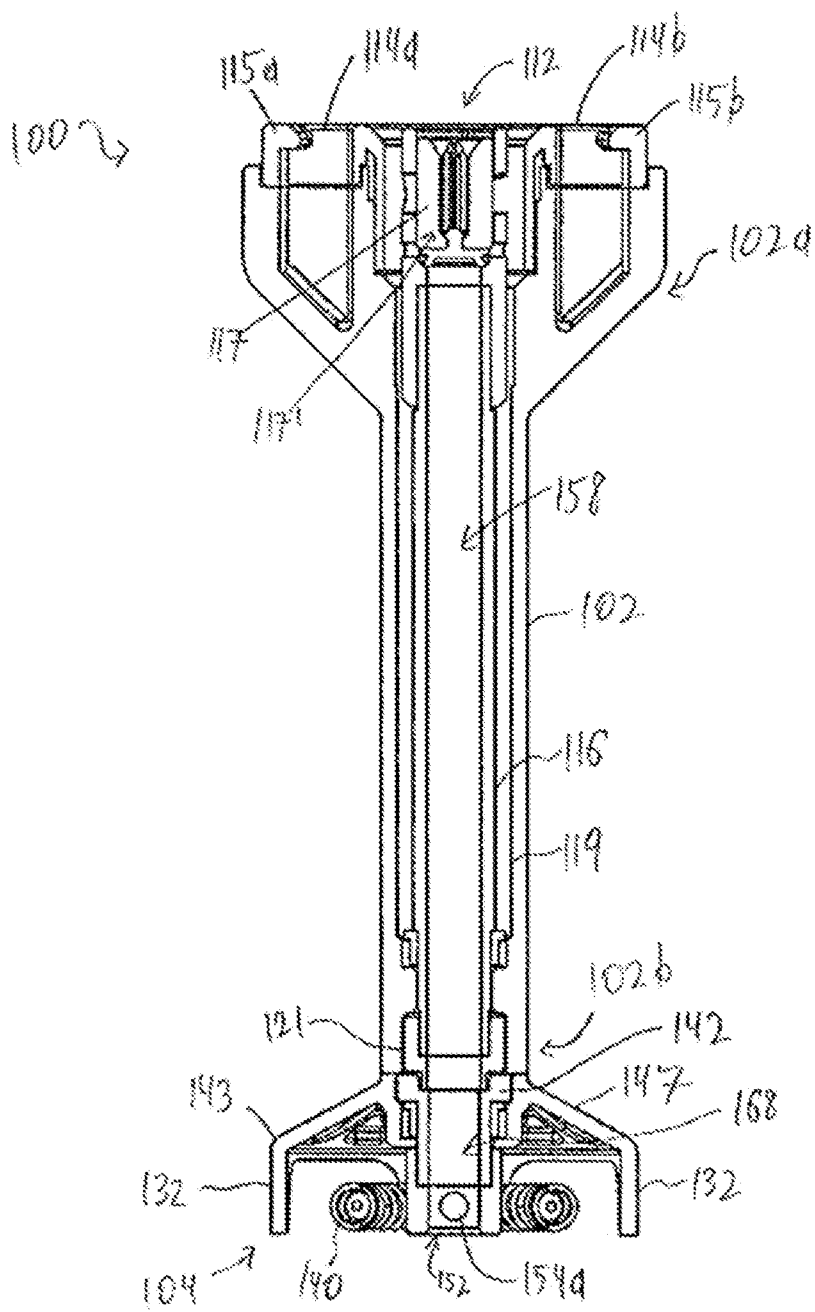
FIG. 10B is a cross-sectional side view of the fluid texturing device of FIG. 9 taken along line 10B-10B in FIG. 9.
Figure 11A:
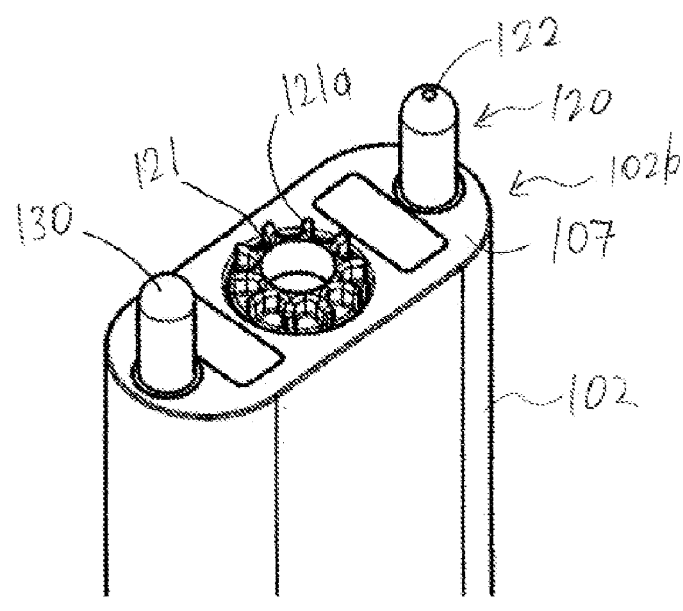
FIG. 11A is a bottom perspective view of the fluid texturing device of FIG. 9, showing a whisk body detached.

As shown in FIG. 10A-10B, the second end 102*b* of the driveshaft 116 can include a connecting feature 121 that is arranged on the end of the driveshaft 116. In certain aspects, as shown in FIG. 11A, the connecting feature 121 can be in the form of a cylindrical-shaped body with a hollow cavity. An opening arranged on the bottom surface of the connecting feature 121 allows for access to the interior of the hollow body. The connecting feature 121 can also include tabs 121*a* disposed therein that are configured to translate rotational motion from the driveshaft 116, as discussed further below. In certain aspects, the tabs 121*a* extend in the vertical direction along an inner surface of the connecting feature 121 such that a corresponding driveshaft can be removed and replaced within the connecting feature 121 relative to the housing 102 in the vertical direction, while still allowing for rotational motion to be transferred from the driveshaft 116 through the connecting feature 121 to the driveshaft 142, which includes corresponding tabs 142*a* to tabs 121*a*. A variety of engagement features can be envisioned to mechanically couple connecting feature 121 to the driveshaft 142, including tabs, slots, linkages, or other coupling mechanisms that can be configured in a corresponding manner on the connecting feature 121 and the driveshaft 142.

Figures 19A, 19B, 19C:
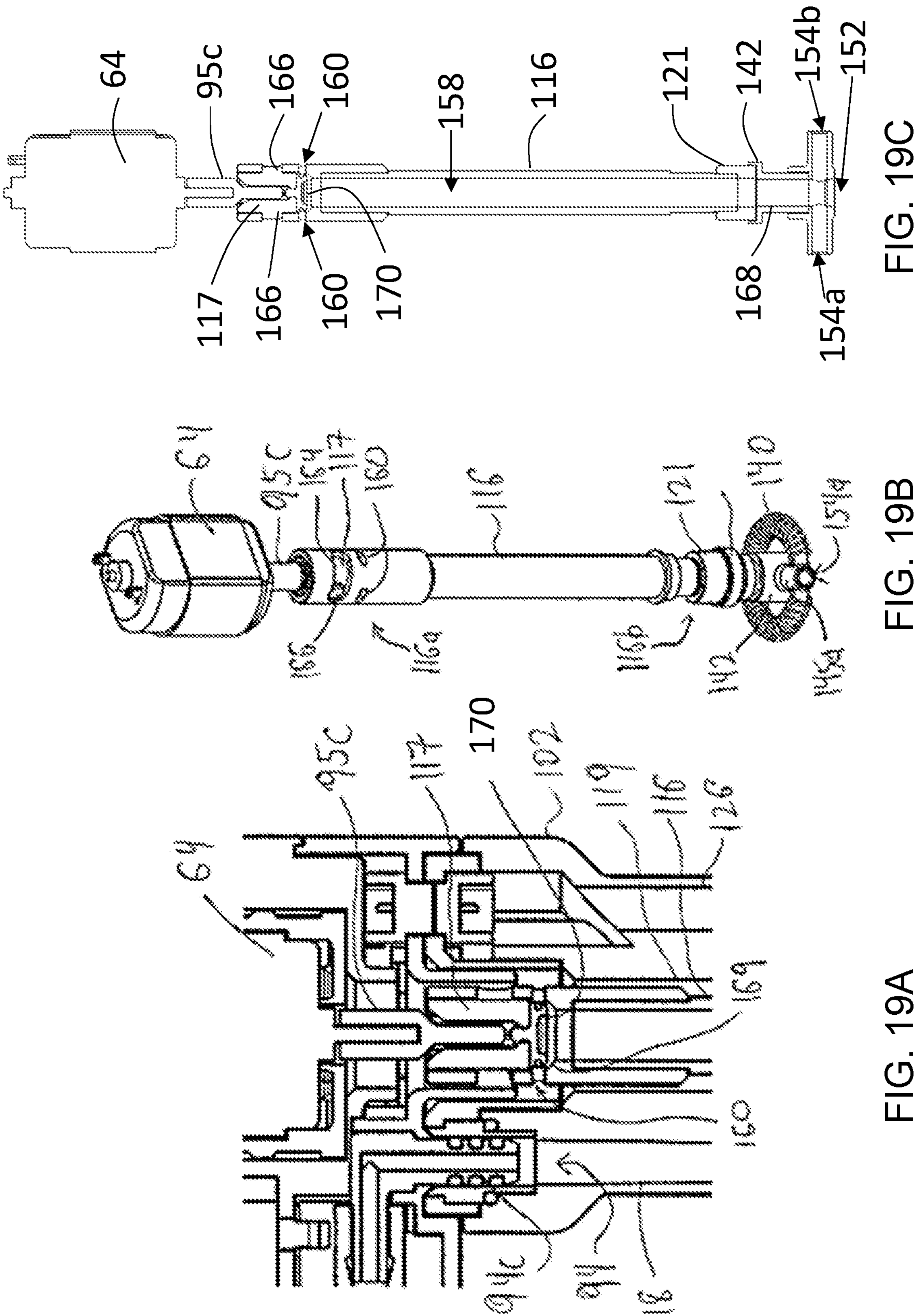
FIG. 19A is a cross-sectional side view of a first end of the fluid texturing device of FIG. 8 showing the coupling configured in an open position.
FIG. 19B is a perspective view of a whisk assembly isolated from the fluid texturing device of FIG. 8 showing the coupling configured in an open position.
FIG. 19C is a cross-sectional side view of the whisk assembly of FIG. 19B showing the coupling configured in an open position.
Figure 19D:
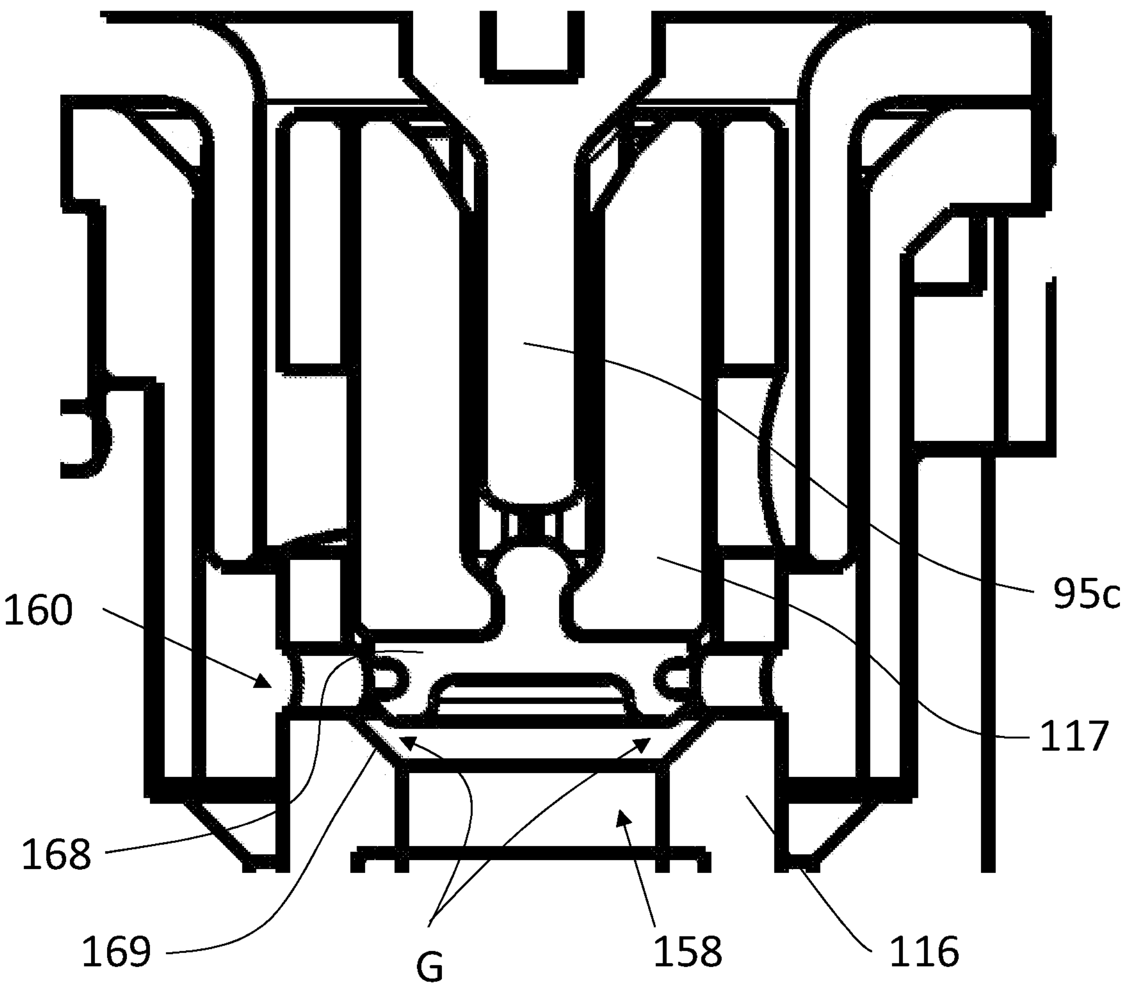
FIG. 19D is a detailed cross-sectional view of the first end of the fluid texturing device of FIG. 8 showing the coupling configured in an open position.
Figures 20A, 20B, 20C:
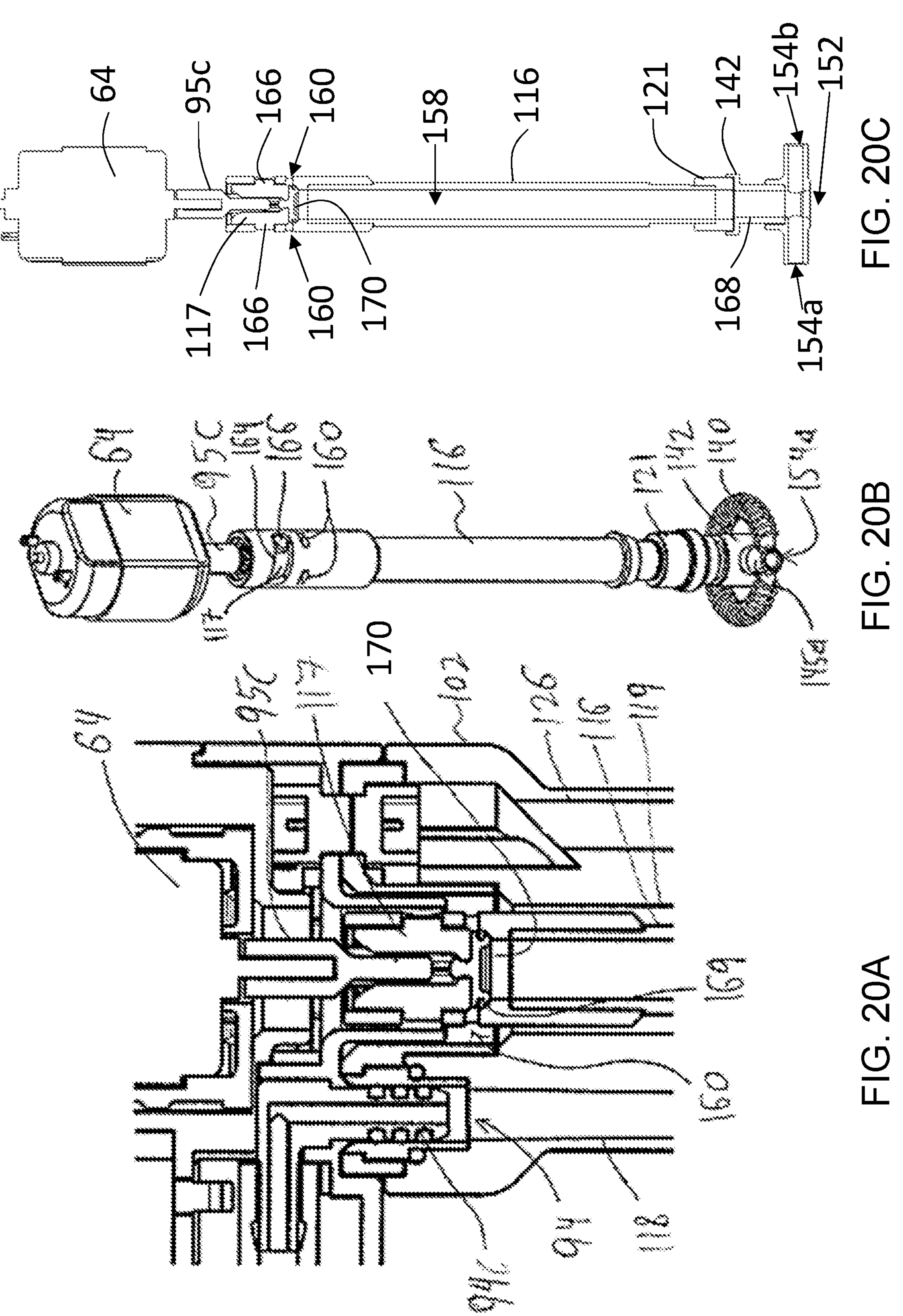
FIG. 20A is a cross-sectional side view of a first end of the fluid texturing device of FIG. 8 showing the coupling configured in a closed position.
FIG. 20B is a perspective view of a the whisk assembly of FIG. 19A showing the coupling configured in a closed position.
FIG. 20C is a cross-sectional side view of the whisk assembly device of FIG. 20B showing the coupling configured in a closed position.

With the driveshaft 116 properly coupled to the driveshaft 142, air can flow from inlets arranged within the driveshaft to a fluid being textured. In order to provide air into a fluid during a texturing process, an air path 158 is arranged through the driveshaft 116. The air path 158 can be sealed or opened depending on the rotational direction of the driveshaft 116. FIGS. 19A-19C depict the air path 158 in an open state, where air can flow through the air path 158 and out of the channels 154*a*, 154*b*, and FIGS. 20A-20C depict the air path 158 in a closed state. The driveshaft 116 includes air inlet apertures 160 arranged on a first end 116*a* of the drive shaft 116. The air inlet apertures 160 are configured to allow air to enter the air path 158 and pass down to the second end 116*b* of the driveshaft 116 in order to incorporate the air into a fluid being textured. In one aspect, the number of inlets 160 can vary from a single inlet to a plurality of inlets. Air is brought into the inlets 160 through openings 161 and channels 163 (shown in FIGS. 5 and 7A) which occur between the coupling 117 of the texturing device 100 and the beverage brewing apparatus 10. These gaps are large enough to allow air to pass into the inlets 160 without the need for dedicated channels. However, the use of dedicated channels being arranged within the fluid texturing device 100 in order to feed air to the inlets 160 is possible and should be considered within the scope of this disclosure.

Also arranged within the first end 116*a* of the driveshaft 116 is at least one circumferential slot 164. In the illustrated embodiment, the drive shaft 116 includes two slots, however only one slot 164 is shown and described. It should be understood that additional slots can have the same configuration. The illustrated circumferential slot 164 is in the form of a cam slot circumferentially arranged about the driveshaft 116. The slot 164 extends partially around the drive shaft 116 and is angularly oriented relative to the longitudinal axis in order to function as a cam, where rotation of the coupling 117 relative to the driveshaft 116 results in linear motion of the coupling 117 relative to the driveshaft 116. In some embodiments, the slot 164 can have an angular or spiral shape about the circumference of the driveshaft 116. As stated above, the coupling 117 is arranged within the first end 116*a* of the driveshaft and is configured to move axially within the driveshaft 116. In order to translate rotational movement of the driveshaft 116 into axial movement of the coupling 117, the coupling 117 includes a post 166 arranged in the circumferential slot 164. Due to the circumferential and axial position of the slot 164, the post 166 moves within the slot 164 as the driveshaft 116 rotates, thus causing the coupling 117 to move axially within the driveshaft 116. The movement of the post 166 within the slot 164 is dependent on the rotational direction of the driveshaft 116. In one aspect, clockwise rotation of the driveshaft 116 will cause the coupling 117 to move vertically upward within the driveshaft 116, and counter-clockwise rotation of the driveshaft 116 will cause the coupling 117 to move vertically downward within the driveshaft 116. The coupling 117 can include an inner sleeve and an outer sleeve. The inner sleeve can include the post(s) 166. The post 166 can extend through the slot 164 arranged in the outer sleeve. The drive feature 95*c* can engage the coupling 117 and upon rotation, cause the coupling 117 and post 166, connected to the coupling 117, to travel within the slot 164 toward a terminal end of the slot 164 at which point the coupling 117 will directly transfer rotational movement to the driveshaft 116.

As the coupling 117 moves vertically downward within the driveshaft 116, a seal 170 positioned on the end of the coupling 117 can contact an inner surface 169 of the driveshaft 116 in order to seal the air path 158. The seal 170 can be arranged on the bottom surface of the coupling 117 within the driveshaft 116. As shown in FIG. 19C, the seal 170 is in the form of a circular plate which is secured to the bottom of the coupling 117 such that when the coupling 117 is vertically raised within the driveshaft 116, a circumferential gap G is formed between the inner surface 169 of the driveshaft 116, and the seal 170. The gap G is arranged adjacent to the inlets 160 such that air can enter the driveshaft 116 via the inlets 160 and pass through the gap G to the air path 158. The seal 170 can be a silicone or rubber seal which can sustainably prevent air from passing between the seal 170 and the inner surface 169. As shown in FIG. 20A, the seal 170 can be axially displaced to contact the inner surface 169, which blocks the flow of air through the air path 158. When the air path 158 is blocked, only steam and/or mechanical whisking are transmitted to the fluid being textured, which can result in a plurality of different fluid texture types.

Figure 14:
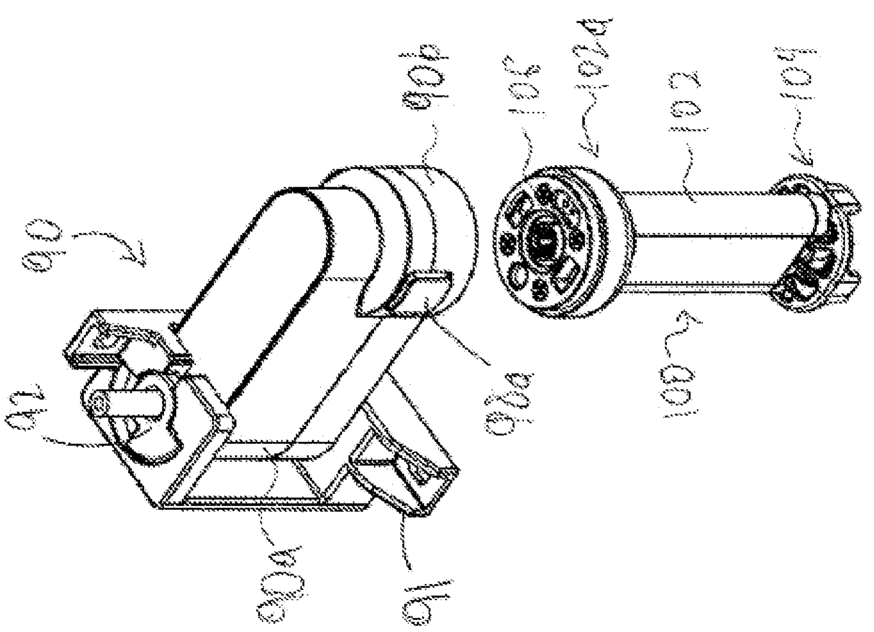
FIG. 14 is top perspective view of the mounting arm of FIG. 4 showing the fluid texturing device of FIG. 9 about to be coupled thereto.
Figure 14:

Referring back to FIGS. 8 and 9, in order to secure the fluid texturing device 100 to the mounting arm 90, the mating face 106 can further include mating grooves 114*a*, 114*b* that correspond to the tabs 99*a*, 99*b* on the mounting arm 90. The mating grooves 114*a*, 114*b* are arranged on opposite sides of the driveshaft port 112, and extend downward into the housing 102. The mating grooves 114*a*, 114*b* can have a shape and size that corresponds to a shape and size of the tabs 99*a*, 99*b*. As illustrated in FIG. 14, the mating grooves 114*a*, 114*b* can each have a flange 115*a*, 115*b* formed therein that is engaged by the tabs 99*a*, 99*b* when the tabs 99*a*, 99*b* are inserted into the mating grooves 114*a*, 114*b*. As stated above, in order to remove the tabs 99*a*, 99*b* from the mating grooves 114*a*, 114*b*, the tabs 99*a*, 99*b* are displaced radially inward by the buttons 98*a*, 98*b*, dislodging the tabs 99*a*, 99*b* from the flanges 115*a*, 115*b*. As shown in FIGS. 5 and 7A, the mounting arm 90 can include openings 161 arranged in the bottom of the mounting arm, and channels 163 extending through the mounting arm 90 from the openings 161 to the driveshaft port 95 in order to supply air to the air path within the driveshaft.

In order to act upon fluid surrounding the fluid texturing device 100, the fluid texturing device 100 further includes a whisk assembly 104 removably coupled to the second end 102*b* of the housing 102, as illustrated in FIGS. 8, 10A-10B, and 12-13. The whisk assembly 104 generally includes a whisk 140, a driveshaft 142, and a whisk cover 143. The whisk cover 143 can have a variety of configurations, but in general it is configured to surround the whisk 140. In certain aspects, the whisk cover 143 can have a frusto-conical shape extending radially outward from the housing 102. The whisk cover 143 can include tabs 132 arranged at an outer circumference thereof and extending downward from the whisk cover 143. The tabs 132 can act as spacers in order to create space between the bottom of the fluid container so that the whisk 140 does not contact the bottom of the fluid container. The tabs 132 can thus have a height that is greater than a height of the whisk 140. Gaps can exist between each of the tabs 132 in order to allow fluid to pass between the tabs 132 to interact with the whisk 140. In addition to the tabs 132, the whisk cover 143 can include at least one or a plurality of aperture(s) 150 and 150' arranged in the top surface thereof. As will be explained in detail below, the apertures 150 and 150' can allow air to interact with the whisk 140.

Figure 11B:
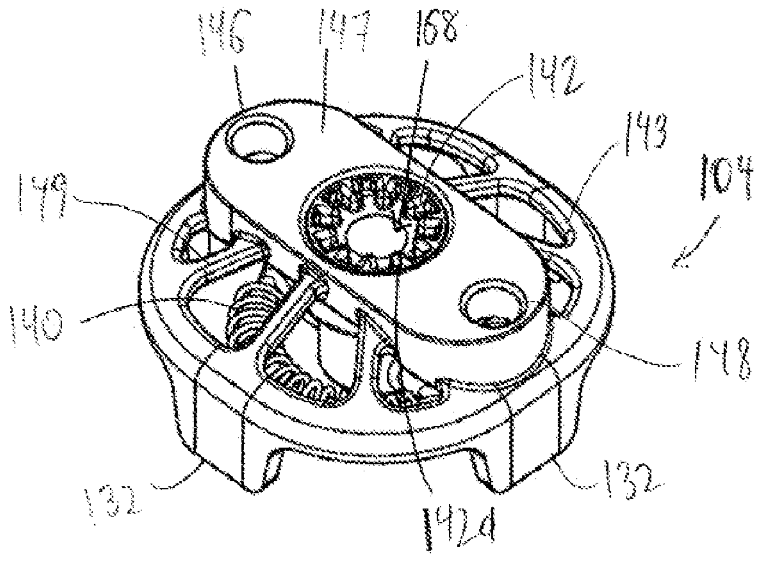
FIG. 11B is a top perspective view of the whisk body of FIG. 9 detached from the fluid texturing device.
Figure 12A:
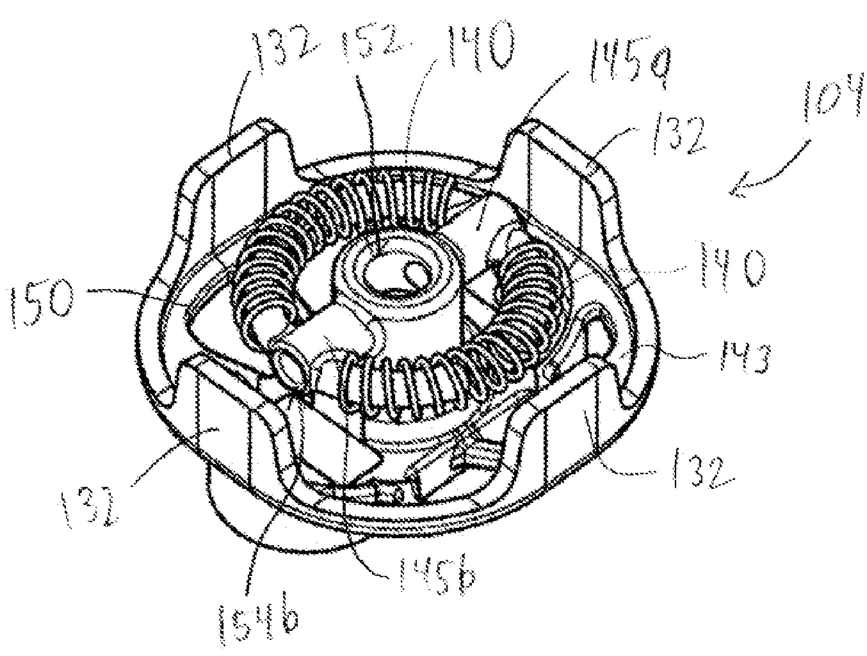
FIG. 12A is a bottom perspective view of the whisk body of FIG. 9 detached from the fluid texturing device.

The whisk cover 143 can also include separate apertures 146, 148 which can be separated by vanes 149, as illustrated in FIGS. 11B and 12A. The illustrated vanes 149 extend radially outward from a central housing 147 of the whisk cover 143. However, the whisk cover can include any number of vanes positioned at any location, or in other embodiments it can lack vanes entirely. Where vanes are present, the apertures 146, 148 can be positioned to allow the tip 120 of the steam injection tube 118 and the temperature sensor 130 to pass through the whisk cover 143 such that the tip 120 and a temperature sensor 130 can be arranged adjacent to the whisk 140. In some embodiments, the driveshaft 116 can include an opening 152 at an end of the driveshaft 116 within the whisk assembly 104, as shown in FIG. 12A.

Figure 12B:
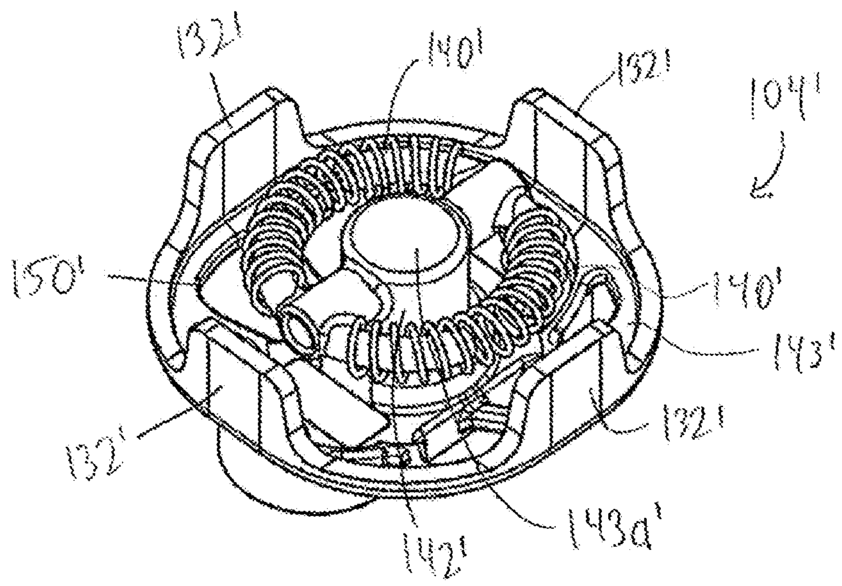
FIG. 12B is a bottom perspective view of another embodiment of a whisk body with a cap on a bottom aperture, shown detached from the fluid texturing device.

FIG. 12B illustrates one embodiment of a whisk assembly 104' in which the driveshaft 142' includes a cover 143*a'* positioned at the opening 152 of the driveshaft 116 within the whisk assembly 104'. The whisk assembly 104' is substantially similar to the whisk assembly 104. Therefore, similar components will not be described in detail. The whisk assembly 104' generally includes a whisk 140', a driveshaft 142', a whisk cover 143', aperture 146', a central housing 147', and aperture 148'. As shown, there are no vanes extending between the central housing 147' and the whisk cover 143', besides the portions where the apertures 146', 148' are arranged.

In order to secure the whisk assembly 104 to the housing 102, the whisk cover 143 can include attachment members which mate with corresponding attachment members in the housing 102. As illustrated in FIG. 13, in one embodiment, the attachment members can be in the form of magnetic elements. For example, the housing 102 can include one or more magnets 109 arranged in the bottom surface 107 and the whisk cover 143 can likewise include one or more magnets 144 arranged therein and aligned with the magnets 109 in the housing 102. The magnets 144 in the whisk cover 143 can be disposed within a central housing 147 of the whisk cover. The central housing 147 can also retain the driveshaft 142 therein, as will be discussed further below. The magnets 144 can circumferentially surround the driveshaft 142 to aid in aligning the driveshaft 142 with the drive connecting feature 121 on the housing 102. In particular, when the whisk assembly 104 is magnetically engaged to the housing 102, the tip 120 and the temperature sensor 130 will pass through the whisk cover 143, and the driveshaft 142 will align with and extend into the connecting feature 121.

In addition to the driveshaft 142 aligning with the connecting feature 121, the driveshaft 142 can include a lumen therein in the form of an air path 168, through which air can be provided to a fluid to be textured. The whisk assembly 104 can further include arms 145*a* and 145*b*, arranged on opposite side of the driveshaft 142, and are arranged perpendicular to the driveshaft 142. Additionally, channels 154*a*, 154*b* can be arranged within the arms 145*a*, 145*b*, respectively, and act as air paths which are fluidically coupled to the air path 168 of the driveshaft 142. As stated above, air can pass through the driveshaft 116 to the driveshaft 142 when the whisk assembly 104 is connected to the driveshaft 116. As air passes through the air path 158 and down into the whisk assembly 104, the air enters an air path 168 arranged within the driveshaft 142 of the whisk assembly 104. The air can then pass through the channels 154*a*, 154*b*, which are configured to be additional air paths, arranged within the mixing arms 145*a*, 145*b*, arranged on the driveshaft 142. This allows for a specific volume of air to be incorporated into a fluid being textured at a variety of whisk speeds.

As illustrated in FIG. 13, the driveshaft 142 is rotatably disposed within the central housing 147 in the whisk cover 143. The whisk 140 can be provided at the terminal end of the driveshaft 116 and can be provided over support members 156*a*, 156*b* extending from channels 154*a*, 154*b*, respectively. Although the whisk assembly 104 is shown with two channels 154, one or more channels 154 can be configured. For example, in some embodiments, 3, 4, 5, or 6 channels 154 can be configured. Each channel 154 can be arranged in a corresponding mixing arm 145. The whisk 140 can be in the form of a coiled metal spring arranged around the support member 156*a*, 156*b* to create a torus-like shape. In one aspect, in addition to being a coiled metal spring, designs for the whisk can include other embodiments, including vanes, paddles, and other wired configurations such as balloon, French, ball, flat, spiral, and conical whisks. As best shown in FIG. 13, the driveshaft 116 can be configured to position the whisk 140 at least partially downward of the tip 120 and the temperature sensor 130, but above the bottom surface of the tabs 132 so as to prevent the whisk 140 from contacting the bottom surface of a fluid container. The driveshaft 116 can include a lumen therein forming an air path 158 between a first end and a second end thereof. The air path 158 can pass through the driveshaft 116 and out of the whisk assembly 104 via the channel 154*a*, 154*b*.

Figure 18:
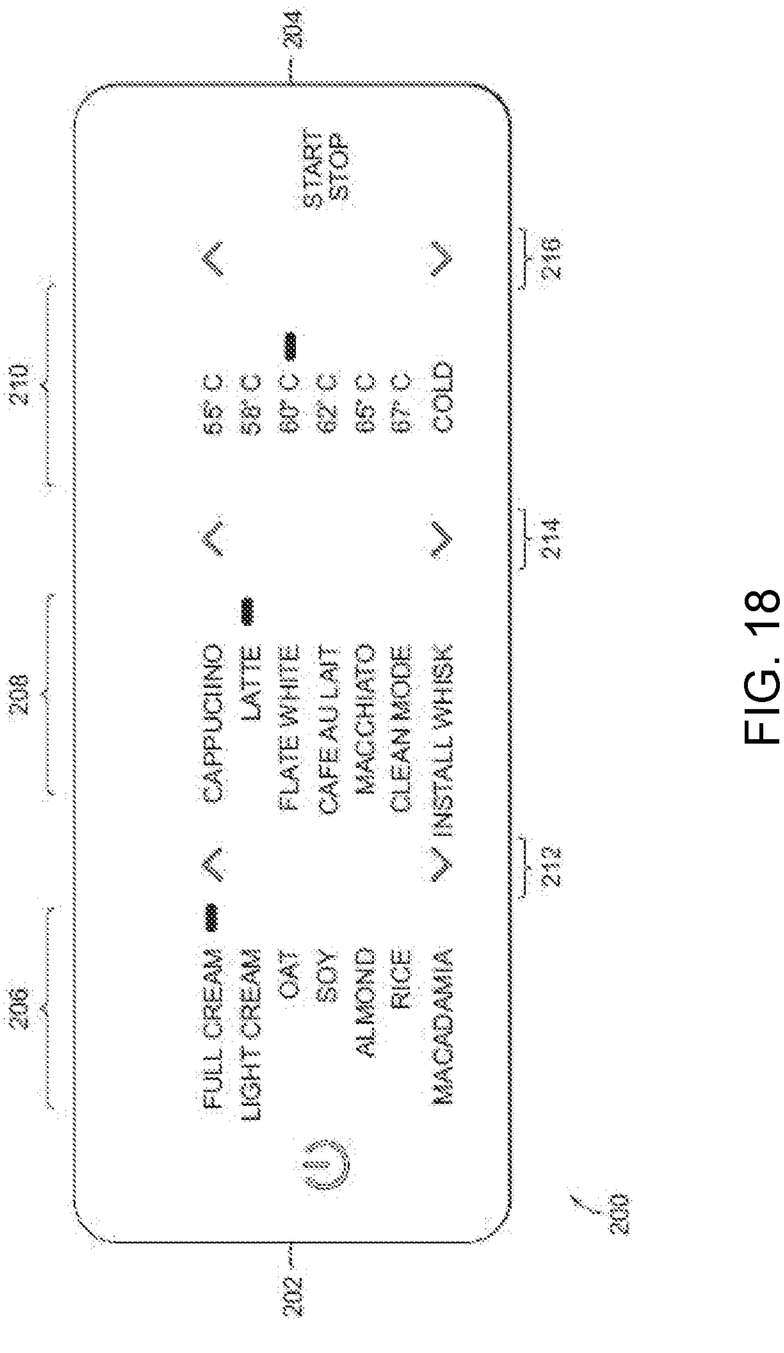
FIG. 18 is a schematic view of one embodiment of a user interface of the beverage brewing apparatus of FIG. 1.

In order to control operation of the beverage brewing system, a user interface can be used to input the desired fluid texture to be produced. FIG. 18 illustrates one embodiment of a user interface 200. As shown, the illustrated user interface 200 includes a power button 202, a start-stop button 204, a fluid type interface 206, a texture type interface 208, and a temperature level interface 210. The user interface can be connected to a processor which in turn controls the steam source and whisk motor. In certain aspects, the fluid type interface 206 can represent different variants of milk and milk-like substitute fluids. Since different milk types have different properties, such a density, the type of fluid being textured should be selected for an optimal fluid texture. The type of fluid can be altered using the controls 212 arranged on the user interface 200. The fluid type texture interface 208 can be used to determine the level of fluid texture that is desired. For example, it may be desirable to have more foam in a cappuccino when compared to a latte. The type of texture desired can be altered using the controls 214 arranged on the user interface 200. Additionally, the desired fluid temperature can be selected by the temperature level interface 210, and altered by the controls 216 arranged on the user interface 200. Using the inputs from the interfaces 206, 208, 210, the proper fluid texture can be achieved automatically by letting the system run a predetermined program including whisk speed and steam input over a timeframe.

In order to achieve a desired fluid texture, the fluid texturing device can be configured to operate in different phases, with each phase having a different rotation per minute (RPMs). In some embodiments, the fluid texturing device can be operated in different rotational directions, such that the whisk can be rotated in a first direction (e.g., a clock-wise direction) in one phase and a second direction that is opposite to the first direction (e.g., a counter-clockwise direction) in a another phase. In some embodiments, a desired fluid texture can be achieved by consistently or intermittently rotating the whisk in the same direction, or by consistently or intermittently rotating the whisk in different directions. The phases can be configured to achieve a desired performance by modifying these settings.

Two or more changes in RPM and or direction between different phases throughout the fluid texturing process can result in a different micro foam texture. In certain aspects, the first working operation for all micro foam textures may start with a high RPM speed in a first rotational direction, whereby both steam and air are momentarily incorporated, prior to integrating with the fluid contained in the container 40. Then, the second working operation for each micro foam texture is based on the desired fluid texture, and may include high RPMs, low RPMs, or no rotation of the whisk 140 in either rotational direction. The amount of simultaneous working time (i.e., steam and whisk rotation) can be dictated by the user selection on the user interface 200, resulting in a different level of micro foam texture for each milk-based drink input. By having multiple phases of heating and agitating, the fluid being textured can be heated quickly, providing small bubbles and desirable texture, while also preventing any overheating of the fluid, causing an undesirable result.

Figure 22:
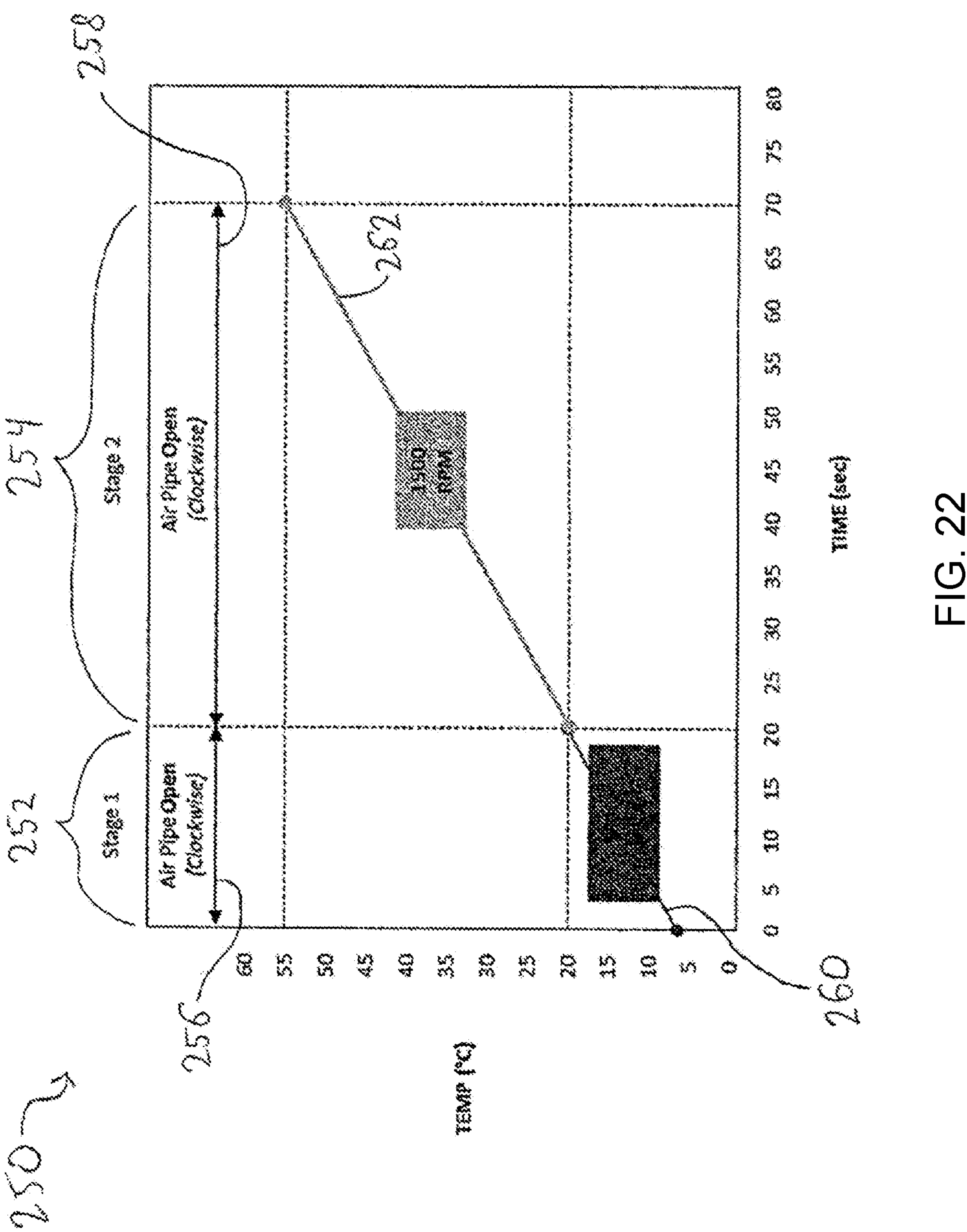
FIG. 22 is a graph showing an operational process of the fluid texturing device of FIG. 8.

An example of a texturing process having different phases is depicted in FIG. 22. The graph 250 depicts a fluid texturing process including a first phase 252 and a second phase 254. Line 256 represents the time duration of the first phase 252, and line 258 represents the time duration of the second phase 254. It is important to note that the time duration of each phase can vary depending on the desired fluid texture. Line 260 represents the increase in temperature of a fluid being textured over time in the first phase 252. Line 262 represents the increase in temperature of the fluid being textured over time in the second phase 254.

During a fluid texturing process, fluid, such as water, retained in the reservoir 32 is pumped into the steam source 60, where it is evaporated and guided as steam under pressure through dedicated tubing 94*a* to the steam injection tube 118 and outlet 122 within the removable whisk cover 143. Steam continually passes through the steam injection tube 118 and exits via the outlet 122 in the tip 120 where it is delivered into the fluid within the fluid container 40. Simultaneously, as steam is delivered via the steam injection tube 118, the whisk 140 is driven by the motor 64 to form a fluid vortex within the container 40. An example of a fluid texturing process for a highly aerated fluid, such as the foam for a cappuccino, is depicted in FIG. 22. As depicted in graph 250, during a first phase 252, the whisk rotates at, e.g., 3000 RPM, in a clockwise direction. The clockwise rotation of the whisk opens the seal 170 in the air path 158 such that air can flow through the air path 158 and into the fluid being textured. This high rotational speed of the whisk 140 can also create a deep vortex within a fluid container 40. In certain aspects, the fluid container 40 can include a lid having an aperture (described below) which allows the housing 102 to pass into the container 40, but prevents spills out of the container during a texturing process.

As the first phase 252 ends, the fluid texturing process may not be fully completed. The second phase 254 can be required to further texture fluid to ensure a proper result. In a second phase 254, the whisk 140 is rotated at a lower RPM when compared to the first phase 252, such as 1500 RPM, also in the clockwise direction, keeping the air pipe 158 open for air to travel through the driveshaft 116 and into the fluid. The lower RPM of the second phase 254 can also result in a vortex which is shallower than the vortex. This allows steam, air, and whisk 140 to texture the fluid for the remaining amount of time of the fluid texturing process.

Figure 23:
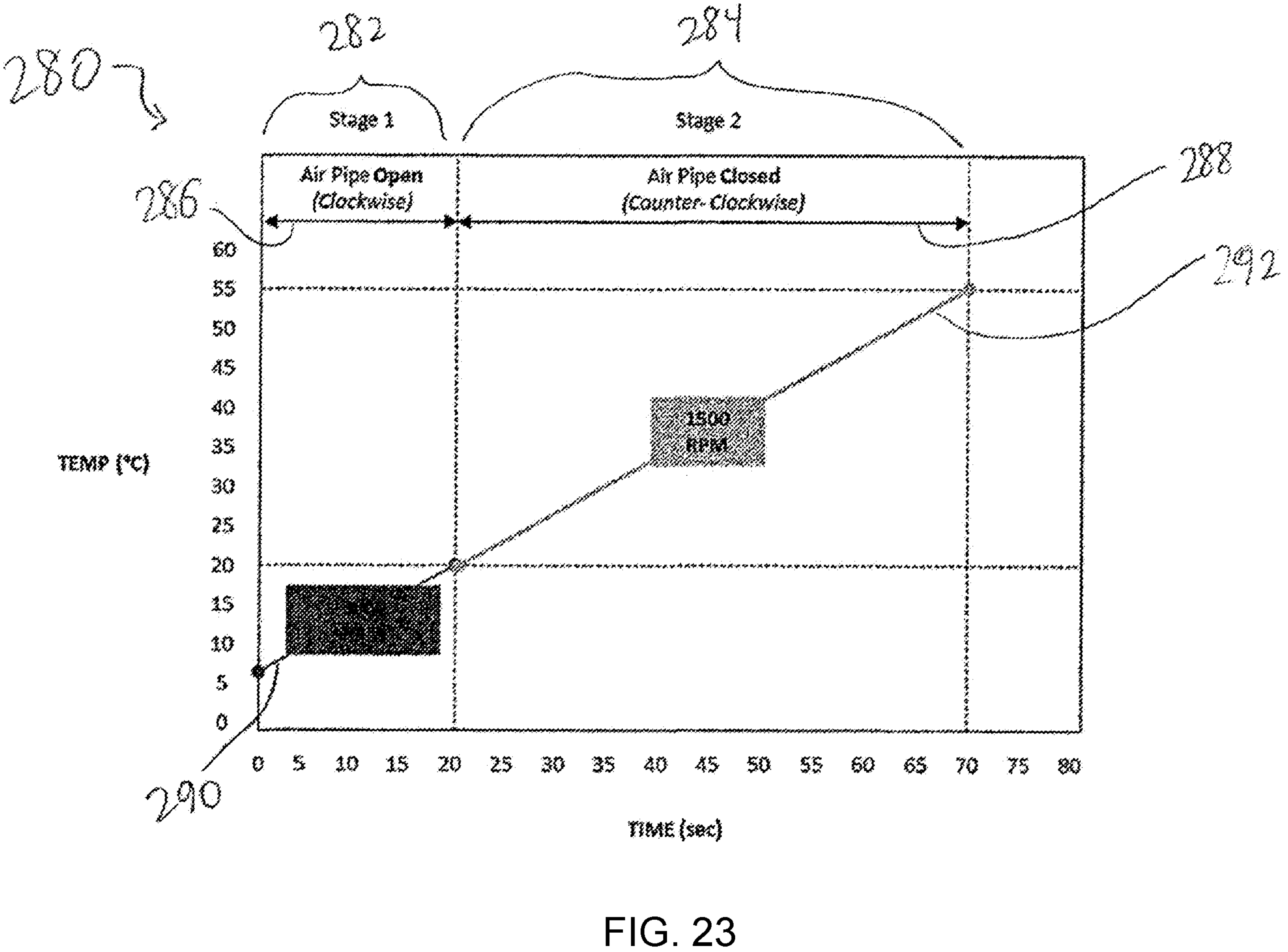
FIG. 23 is a graph showing another operational process of the fluid texturing device of FIG. 8.

As stated above, not every texturing process requires the air path 158 to be open for the whole process. FIG. 23 depicts a fluid texturing process for a latte, which does not require as much aeration as the process to produce the foam for a cappuccino, as depicted in FIG. 22. As depicted in graph 280, during a first phase 282, the whisk rotates at, e.g., 3000 RPM, in a clockwise direction. The clockwise rotation of the whisk opens the seal 170 in the air path 158 such that air can flow through the air path 158 and into the fluid being textured, similar to the first phase 252 of graph 250. Line 286 represents the time duration of the first phase 282, and line 288 represents the time duration of the second phase 284. Line 290 represents the increase in temperature of a fluid being textured over time in the first phase 282. Line 292 represents the increase in temperature of the fluid being textured over time in the second phase 284.

As the first phase 282 ends, the fluid texturing process may not be fully completed. The second phase 284 can be required to further texturize fluid to ensure a proper result. In a second phase 284, the whisk 140 is rotated at a lower RPM when compared to the first phase 282, such as 1500 RPM, also in the counter-clockwise direction, sealing the air pipe 158 using seal 170, and preventing air to travel through the driveshaft 116 and into the fluid. This allows only steam and whisk 140 to texture the fluid for the remaining amount of time of the fluid texturing process.

It should be noted that the whisk 140, when used sequentially with steam, can vary the amount of air incorporated into the fluid by adjusting the RPM of the whisk 140. In one aspect, the RPMs at which the whisk 140 rotates may be controlled by a user through a user interface. Additionally, in one aspect, the temperature which steam is output and/or a target temperature of a fluid being textured can be manually controlled by a user. For example, a user can select a specific texturing process, such as a latte for oat milk. The fluid texturing device will automatically determine a target temperature based on the selected texturing process parameters. However, a user can also have the option to alter the target temperature if they desire a hotter or colder textured fluid, such as within a range of −5° C. the target temperature to +5° C. the target temperature.

Figure 17B:
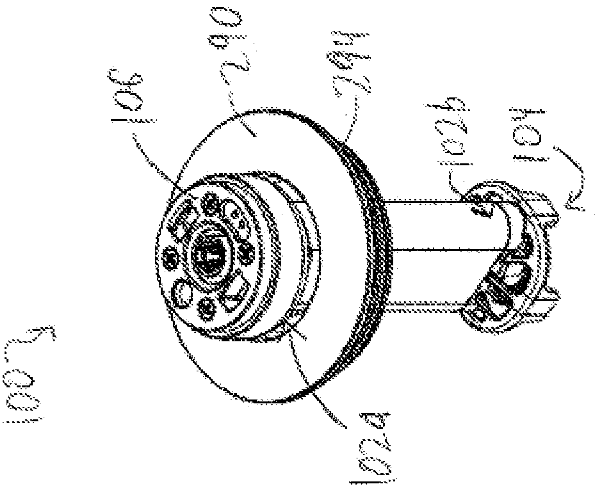
FIG. 17B is a perspective view of the fluid texturing device of FIG. 17A arranged within the lid.
Figure 17A:
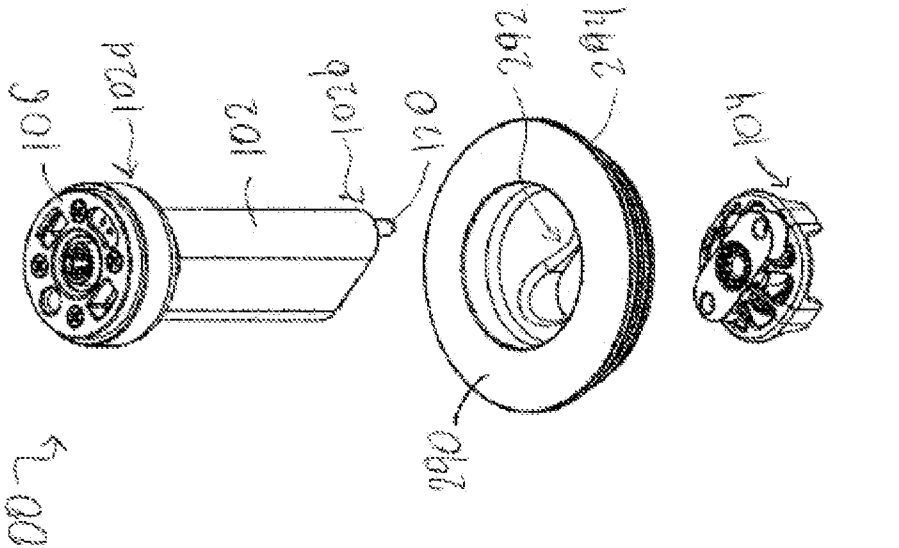

In another embodiment, a container is provided for use with the fluid texturing device. Due to the agitation of a fluid and the release of steam during a fluid texturing process, it can be beneficial to enclose the container where the fluid texturing device is operating. Accordingly, FIGS. 17A-17E illustrate the fluid texturing device 100 used in combination with a cover 290 and a container 40 to form a fluid texturing assembly 101. While the cover can have a variety of configurations, in the illustrated embodiment the cover 290 generally includes an aperture 292 arranged within the center of the cover 290 and a seal 294 arranged around the cover 290. The aperture 292 can be shaped to correspond with the cross-section of the housing 102 so that fluid does not escape between a space between the housing 102 and the cover 290. The fluid texturing device 100 can be inserted into the aperture 292 by removing the whisk assembly 104 from the housing and placing the second end 102*b* of the housing into the aperture 292. The whisk assembly 104 can then be connected to the housing 102 after the housing 102 is passed through the aperture 292, as shown in FIG. 17B. Even though the aperture 292 is shaped to correspond with the cross-section of the housing 102, the housing 102 can slide freely along a vertical axis relative to the cover 290 while arranged within the aperture 292.

In one aspect, the cover 290 for the container 40 can be designed such that the housing 102 can be inserted into the cover 290 without removal of the whisk assembly 104. In an example embodiment, the cover 290 can include two separate halves/pieces which are configured to be installed on the container 40 on either side of the housing 102, such that the housing can be inserted into the container first, and then the two pieces of the cover 290 can be inserted on the container 40 around the housing 102. The two pieces of the cover can abut one another when arranged on the container 40, and effectively cover the entire opening of the container 40 when arranged thereon except for the aperture which the housing 102 is arranged in. Alternatively, the cover 290 can include a hinge structure where two pieces of the cover 290 are attached to an outer ring of the cover and open/close to enable the installation or removal of the housing 102 from the cover 290 without removal of the whisk assembly 104. A two piece cover 290 would allow for a fluid texturing device 100 where the housing 102 and the whisk assembly 104 are permanently affixed to each other.

Figure 17D:
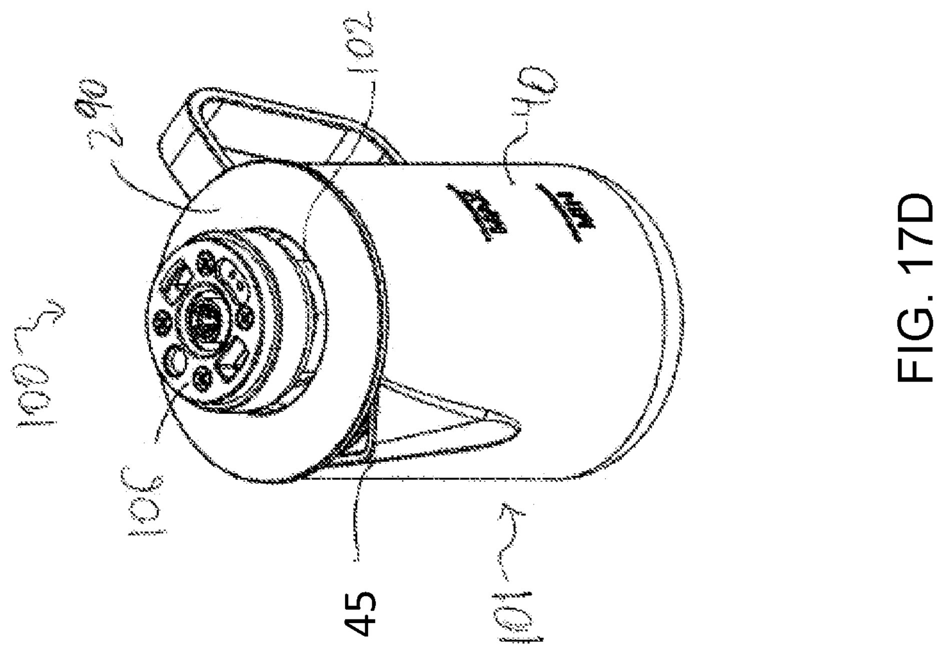
FIG. 17D is a perspective view of the fluid texturing device, lid, and container of FIG. 17C shown fully assembled.
Figure 17C:
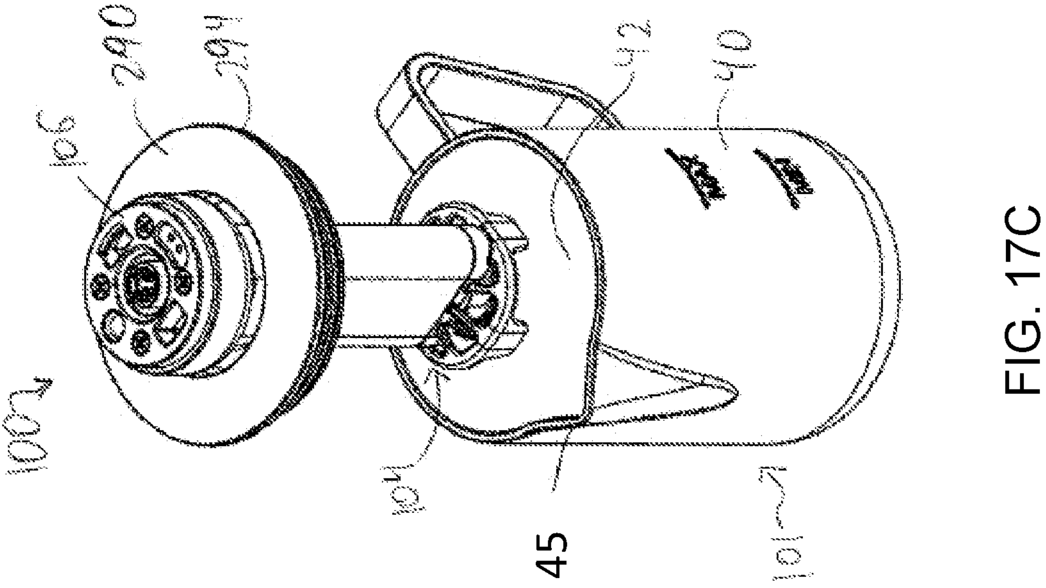
FIG. 17C is a perspective view of the fluid texturing device and lid of FIG. 17B shown in combination with a container.

With the housing 102 arranged within the cover 290, the cover 290 can be positioned on the container 40. The container 40 can include fluid 42 placed within the container to be textured, such as milk or a milk-like fluid. The seal 294 on the cover 290 can abut the edge of the container 40 to keep fluid 42 from spilling out of the container 40 during a texturing process. As illustrated in FIG. 17D, the cover 290 extends across the upper opening of the container 40 to enclose the container. In one embodiment, the container 40 can include a spout 45 which is not covered by the cover 290 to allow a user to dispense fluid 42 from the container 40 without removing the cover 290 from the container 40.

Figure 17F:
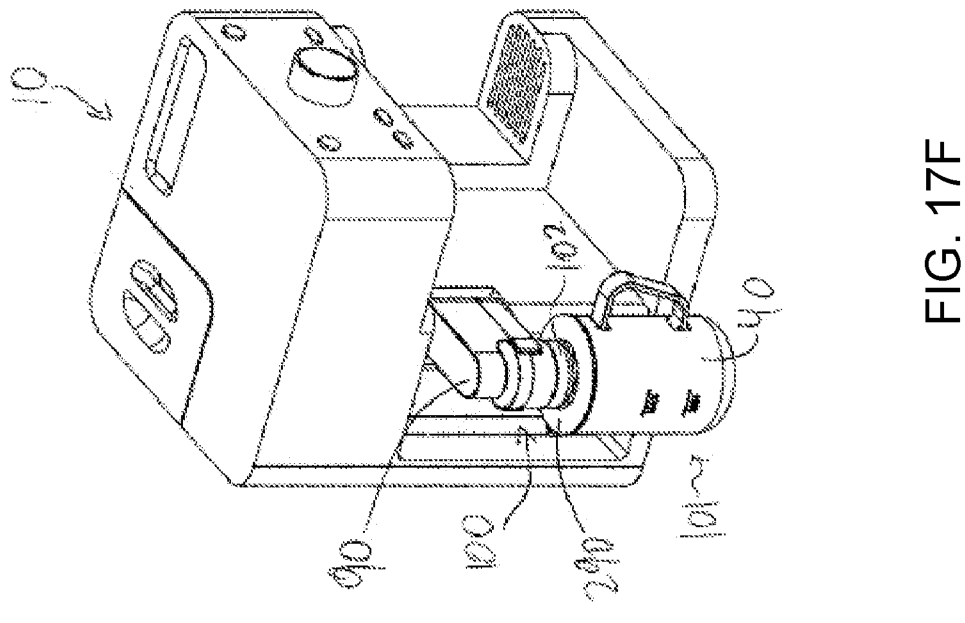
FIG. 17F is a perspective view of the fluid texturing device, lid, and container of FIG. 17E connected to the beverage brewing system of FIG. 1.
Figure 17E:
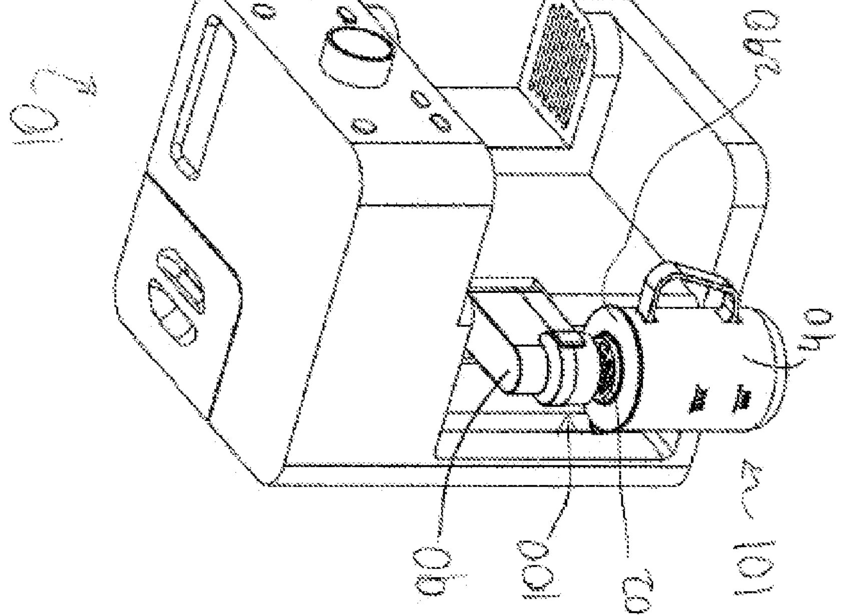
FIG. 17E is a perspective view of the fluid texturing device, lid, and container of FIG. 17D about to be connected to the beverage brewing system of FIG. 1.

With the housing 102 fully advanced into the container 40, as illustrated in FIG. 17E, the fluid texturing assembly 101 can be arranged underneath the mounting arm 90 of the beverage brewing apparatus 10 such that the housing 102 is aligned with the mounting arm 90. With the fluid texturing assembly 101 arranged underneath the mounting arm 90, the housing 102 can be displaced upward along the vertical axis in order to connect the housing 102 with the mounting arm 90, as illustrated in FIG. 17F. The container 40 can rest on a support surface during the connecting process and a texturing process. Alternatively, the entire container 40/housing 102 assembly may be lifted by the user to connect the housing 102 to the mounting arm 90, after which, the container may be lowered to the support surface. In one embodiment, the whisk assembly 104, including tabs 132, does not contact the bottom surface of the container 40 during a texturing process. In order to remove the container 40 to access the textured fluid 42, the buttons 98*a*, 98*b* can be depressed, as described above, to release the housing 102 from the mounting arm 90. Where a spout 45 is included, a user can pour the textured fluid from the spout 45 without removing the cover 290 or the housing 102.

Figure 21:
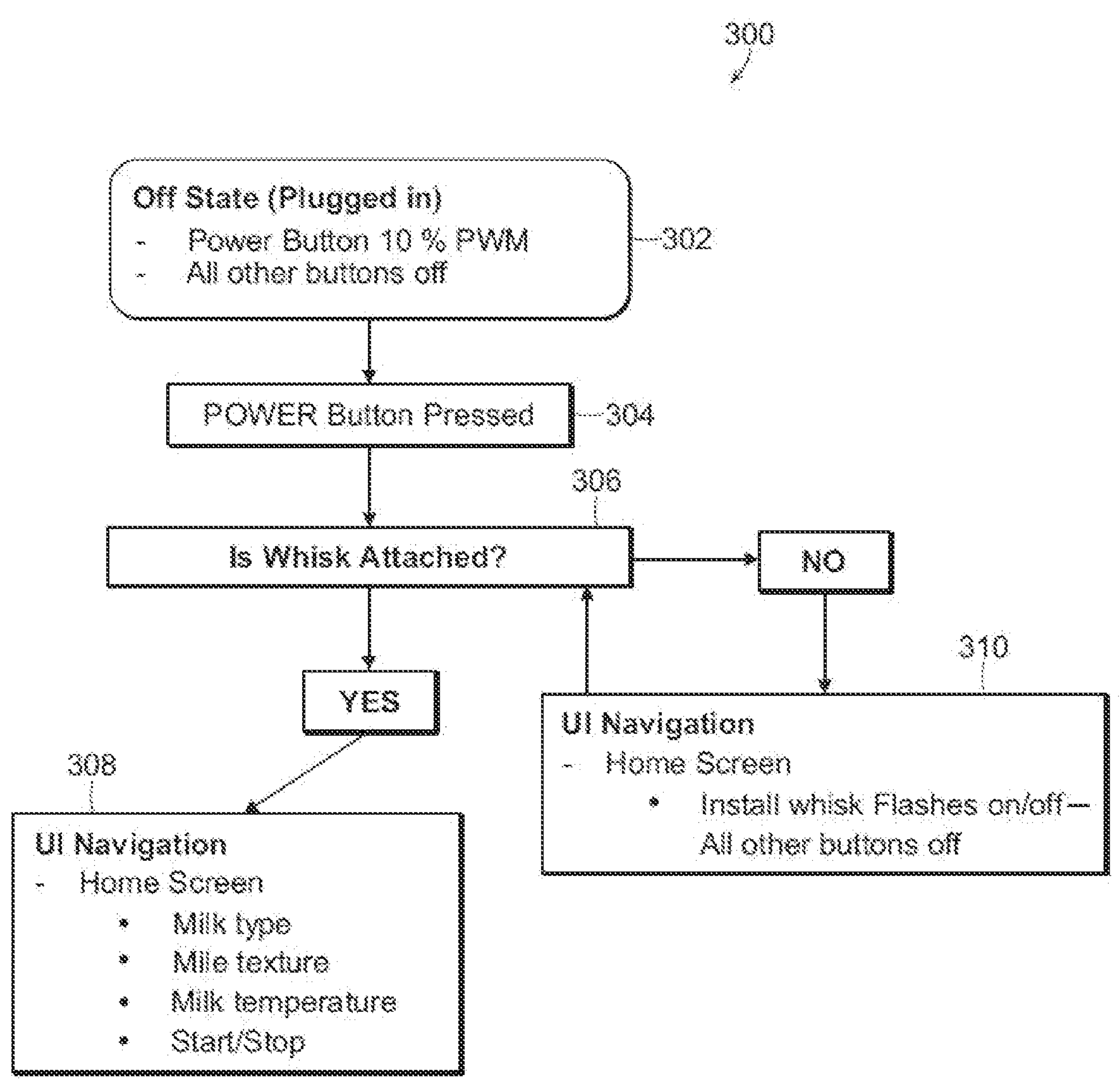
FIG. 21 is a chart illustrating one embodiment of a fluid texturing device detection process performed by the beverage brewing apparatus of FIG. 1.

In certain aspects, the beverage brewing apparatus 10 runs a determination check to ensure that the fluid texturing device 100 is properly secured to the beverage brewing apparatus 10. FIG. 21 represents a process 300 for ensuring that the fluid texturing device 100 is connected and set up for a texturing process. While the beverage brewing apparatus 10 is powered (i.e., plugged into to a 120V wall outlet), the beverage brewing apparatus 10 is in a low-power mode, represented in step 302. In the low-power mode at step 302, the buttons on the user interface are turned off, and the power button is at a 10% power level to illuminate the power button. When the power button is pressed to turn on the beverage brewing apparatus 10 at step 304, the controller within the beverage brewing apparatus 10 may determine if the fluid texturing device 100 is attached to the beverage brewing apparatus 10. The processor may determine the connection state of the fluid texturing device 100 by using the electrical connection between the electrical terminals 80, 86, arranged on the mounting arm 90 and the housing 102, respectively. If no signal is detected from the temperature sensor 130 through the electrical terminals 80, 86, the processor may activate a notification at step 310, such as a blinking light illuminating text stating "Install Whisk". Additionally, all the other buttons and lights on the user interface would be deactivated. Once the fluid texturing device 100 is installed properly, the controller may then activate the user interface at step 308, and allow a user to select their texturing preferences in order to begin a texturing process.

While the above description describes the fluid texturing device 100 in combination with a beverage brewing apparatus, the fluid texturing device 100 can also be implemented as a stand-alone device, where the fluid texturing device can include a separate reservoir and separate heater for producing steam separately from a beverage brewing system.

Certain exemplary implementations have been described to provide an overall understanding of the principles of the structure, function, manufacture, and use of the systems, devices, and methods disclosed herein. One or more examples of these implementations have been illustrated in the accompanying drawings. Those skilled in the art will understand that the systems, devices, and methods specifically described herein and illustrated in the accompanying drawings are non-limiting exemplary implementations and that the scope of the present invention is defined solely by the claims. The features illustrated or described in connection with one exemplary implementation may be combined with the features of other implementations. Such modifications and variations are intended to be included within the scope of the present invention. Further, in the present disclosure, like-named components of the implementations generally have similar features, and thus within a particular implementation each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described implementations. Accordingly, the present application is not to be limited by what has been particularly shown and described, except as indicated by the appended claims. All publications and references cited herein are expressly incorporated by reference in their entirety.

What is claimed is:

1. A beverage brewing apparatus, comprising:

a primary housing having a mounting arm with a connecting feature thereon; and a fluid texturing device comprising a hollow secondary housing having a mating portion configured to removably engage with the connecting feature on the primary housing for removably mating the fluid texturing device to the primary housing, a driveshaft having a first end and a second end opposite the first end, the driveshaft extending from the mating portion and through the hollow secondary body and having a whisk mounted on the second end thereof, the driveshaft including an air path extending from the first end to the second end of the driveshaft; and a coupling arranged within the driveshaft and axially movable within the driveshaft such that the coupling variably blocks the air path to prevent a flow of air through the air path.

2. The beverage brewing apparatus of claim 1, further comprising a steam injection tube extending from the mating portion and through the hollow secondary body and having an outlet configured to eject steam, wherein the steam injection tube is spaced apart from the driveshaft such that the outlet is spaced from the whisk.

3. The beverage brewing apparatus of claim 1, wherein a first electrical terminal on the connecting feature of the primary housing is configured to contact a second electrical terminal on the mating portion of the hollow secondary housing.

4. The beverage brewing apparatus of claim 1, wherein the primary housing has a fluid reservoir, a fluid outlet, and at least one heater configured to heat fluid flowing from the fluid reservoir to the fluid outlet.

5. The beverage brewing apparatus of claim 1, wherein a controller is configured to detect attachment of the removable fluid texturing device to the primary housing.

6. The beverage brewing apparatus of claim 5, further comprising a user interface operably coupled to the controller, the user interface configured to receive an input corresponding to a fluid texturing process parameter associated with a revolution per minute setting of the whisk and a rotational direction of the whisk.

7. The beverage brewing apparatus of claim 6, wherein the fluid texturing process parameter further defines a target temperature of a fluid textured via the fluid texturing device, the target temperature being adjustable via the user interface.

8. The beverage brewing apparatus of claim 1, wherein the coupling includes at least one post movably arranged within a slot in the driveshaft such that rotation of the driveshaft in a first rotational direction moves the coupling in a first axial direction relative to the driveshaft, and rotation of the driveshaft in a second rotational direction moves the coupling in a second axial direction relative to the driveshaft.

9. The beverage brewing apparatus of claim 8, wherein the slot is positioned at a first end of the drive shaft and comprises an angular or spiral shape extending around at least a portion of a circumference of the driveshaft.

10. The beverage brewing apparatus of claim 1, wherein a first end of the primary housing has at least one connecting feature configured to removably couple the primary housing to a beverage brewing apparatus.

11. The beverage brewing apparatus of claim 1, wherein the whisk is removably coupled to the second end of the driveshaft.

12. The beverage brewing apparatus of claim 1, wherein the whisk includes a second air path fluidly coupled to the air path of the driveshaft, and at least one mixing arm arranged perpendicular to the driveshaft, the mixing arm including the second air path and an air outlet arranged at a distal end of the mixing arm.

13. The beverage brewing apparatus of claim 1, further comprising a steam injection tube extending through the housing and having a first end coupled to a first end of the hollow secondary housing and configured to couple to a steam source, and a second end adjacent to a second end of the hollow secondary housing and having an outlet for ejecting steam therefrom, the steam injection tube being spaced from the driveshaft such that the outlet is spaced from the whisk.

14. The beverage brewing apparatus of claim 13, wherein the outlet of the steam injection tube is positioned vertically above the whisk.

15. The beverage brewing apparatus of claim 13, wherein the steam injection tube passes through an aperture within a whisk cover positioned around the whisk.

16. The beverage brewing apparatus of claim 15, wherein the whisk cover comprises a plurality of tabs positioned circumferentially therearound and a plurality of apertures therein, the whisk cover having a frustoconical shape and including the whisk positioned therein.

17. The beverage brewing apparatus of claim 15, further comprising a temperature sensor extending through at least one first aperture of the whisk cover and positioned radially from the whisk.

18. The beverage brewing apparatus of claim 15, wherein at least one second aperture of the whisk cover is positioned superior to the whisk relative to a longitudinal axis extending through the driveshaft, the at least one second aperture configured to allow air to contact the whisk.

19. The beverage brewing apparatus of claim 15, wherein the whisk cover includes a first plurality of magnets configured to releasably couple the whisk cover with a second plurality of magnets positioned in the second end of the housing.

20. The beverage brewing apparatus of claim 1, wherein the mounting arm comprises at least one air inlet fluidically coupled with coupling via the air path extending from the first end to the second end of the driveshaft.

* * * * *